United States Patent
Yi

(10) Patent No.: US 11,305,654 B2
(45) Date of Patent: Apr. 19, 2022

(54) APPARATUS FOR CONTROLLING ENERGY CONSUMPTION AND METHOD THEREOF

(71) Applicant: LG ELECTRONICS INC., Seoul (KR)

(72) Inventor: Na Young Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 16/551,256

(22) Filed: Aug. 26, 2019

(65) Prior Publication Data
US 2020/0009970 A1    Jan. 9, 2020

(30) Foreign Application Priority Data
Jul. 11, 2019    (KR) .................... 10-2019-0083876

(51) Int. Cl.
*B60L 15/20* (2006.01)
*B60L 3/12* (2006.01)

(52) U.S. Cl.
CPC ............ *B60L 15/2045* (2013.01); *B60L 3/12* (2013.01); *B60L 2260/54* (2013.01)

(58) Field of Classification Search
CPC .... B60L 15/2045; B60L 3/12; B60L 2260/54; B60L 3/0038; B60L 2260/52; B60L 2240/72; B60L 58/12; B60L 2240/66; B60L 2240/64; B60L 2250/16; Y02T 10/70; Y02T 10/72; Y02T 90/16; B60Y 2200/91
See application file for complete search history.

(56) References Cited

U.S. PATENT DOCUMENTS

| | | | | |
|---|---|---|---|---|
| 2012/0316714 | A1* | 12/2012 | Nagayanagi | B60L 58/12 701/22 |
| 2013/0332057 | A1* | 12/2013 | Moore | G06T 17/05 701/118 |
| 2017/0343702 | A1* | 11/2017 | Radich | G06Q 10/04 |
| 2020/0409361 | A1* | 12/2020 | Herman | B60W 10/24 |

FOREIGN PATENT DOCUMENTS

KR    1417401    5/2014

OTHER PUBLICATIONS

Oumer Teyeb, Gustav Wikström, Magnus Stattin, Thomas Cheng, Sebastian Faxér, Hieu Do. "Evolving LTE to fit the 5G future" vol. 1, Ericsson Technology Review, Jan. 31, 2017. (Year: 2017).*
Andrés González, "New mobile networks set to enable remote driving, Telefonica says", Reuters Feb. 27, 2017 (Year: 2017).*

\* cited by examiner

*Primary Examiner* — James J Lee
*Assistant Examiner* — Shon G Foley
(74) *Attorney, Agent, or Firm* — Fish & Richardson P.C.

(57) ABSTRACT

An apparatus for controlling energy consumption of a vehicle includes an input unit configured to receive an input of a destination, a sensor unit configured to sense environment information of an area around the vehicle, and a control unit configured to calculate an amount of energy available from an energy supply source, estimate a movable distance of the vehicle based on the calculated amount of energy, and compare the estimated movable distance with a distance to the destination to thereby determine whether to activate a power saving driving mode. The control unit searches for a route to a position corresponding to the destination and divides the route into a plurality of sectors. The power saving driving mode is a mode in which the sensor unit is deactivated in at least one of the plurality of sectors.

18 Claims, 10 Drawing Sheets

APPARATUS FOR CONTROLLING ENERGY CONSUMPTION AND METHOD THEREOF

CROSS-REFERENCE TO RELATED APPLICATION

This present application claims benefit of priority to Korean Patent Application No. 10-2019-0083876, entitled "APPARATUS FOR CONTROLLING ENERGY CONSUMPTION AND METHOD THEREOF" and filed on Jul. 11, 2019, in the Korean Intellectual Property Office, the entire disclosure of which is incorporated herein by reference.

BACKGROUND

1. Technical Field

The present disclosure relates to an apparatus and method for controlling energy consumption of a vehicle, in particular, an electric vehicle.

2. Description of Related Art

In modern society, vehicles are an indispensable means of transportation, and require a source of energy that can be converted into kinetic energy for moving goods. However, the supply amount of the energy supply source for moving the vehicle is limited due to the limited size of the vehicle. Moreover, in the case of electric vehicles, driven by electric energy, when the supply of electric energy is insufficient, for example, if the battery serving as the energy supply is discharged before reaching a charging station, the safety of the electric vehicle may be impaired.

Particularly, in the case of an autonomous vehicle, the operation time of a sensor for supporting safety related functions such as object recognition becomes long, and accordingly, the amount of energy used also increases, and the possibility that the energy supply becomes insufficient also increases.

An existing method for securing running safety of an electric vehicle in preparation for the situation described above is disclosed in Korean Patent Registration No. 1417401. According to this disclosure, a distance to empty may be calculated based on road environment information and a remaining battery power amount, and a distance value that ensures running of the electric vehicle on the basis of battery load and driver propensity information may be provided.

However, according to the method disclosed in Korean Patent Registration No. 1417401, the travelable distance is calculated only in accordance with the remaining battery power amount of the vehicle, and cannot be adjusted. As such, driving safety cannot be guaranteed when it is judged that driving to the destination is impossible due to the remaining battery power amount being insufficient.

For this reason, it is not possible to satisfy a user's desire to secure driving safety of the vehicle by optimizing the energy consumption according to the available energy amount of the energy supply source.

Therefore, there is a demand for a technology for optimizing energy consumption so as to enable a vehicle to reach a destination within the available energy amount of the energy supply source of the vehicle.

SUMMARY OF THE INVENTION

An aspect of the present disclosure is to address a shortcoming associated with some related art discussed above in which the travelable distance according to the amount of energy cannot be changed according to the distance to the destination, by providing an apparatus and method for controlling energy consumption which are capable of securing driving to the destination through optimizing energy consumption.

An aspect of the present disclosure is to provide an apparatus and method for controlling energy consumption capable of providing convenience to a vehicle user by informing the user of functions that are restricted at the time of energy saving according to a user selection in controlling the amount of energy consumption of the vehicle, and informing the user of functions which can be reinforced by using an extra amount of energy which becomes available due to the energy saving.

It will be appreciated by those skilled in the art to which the present disclosure pertains that aspects to be achieved by the present disclosure are not limited to what has been disclosed hereinabove, and other aspects will be more clearly understood from the following detailed description below.

An apparatus for controlling energy consumption of a vehicle according to an embodiment of the present disclosure is configured to divide a route to a destination into a plurality of sectors, reduce energy consumption by deactivating a sensor unit in some of the plurality of sectors, and by doing so guarantee arrival of the vehicle at the destination.

In detail, an apparatus for controlling energy consumption of a vehicle including an energy supply source according to an embodiment of the present disclosure may include: an input unit configured to receive an input of a destination; a sensor unit configured to sense environment information of an area around the vehicle; and a control unit configured to calculate an amount of energy available from the energy supply source, estimate a movable distance of the vehicle based on the calculated amount of energy, and compare the estimated movable distance with a distance to the destination to thereby determine whether to activate a power saving driving mode. The control unit may search for a route to a position corresponding to the destination and divide the route into a plurality of sectors. The power saving driving mode is a mode in which the sensor unit is deactivated in at least one of the plurality of sectors.

According to this embodiment of the present disclosure, the apparatus may further include a communication unit configured to receive traveling information from an information providing server, wherein the control unit may receive traveling information for the route searched from the communication unit, detect one or more vehicle densities according to one or more positions on the route according to the received traveling information, evaluate a similarity of the detected vehicle densities, and set sectors having similar vehicle densities as one sector.

According to this embodiment of the present disclosure, the communication unit may receive a remote control signal based on a downlink grant of a fifth generation (5G) network connected for operation of autonomous driving, and the control unit may control the vehicle to be driven according to the remote control signal when the estimated movable distance exceeds the distance to the destination.

According to this embodiment of the present disclosure, the apparatus may further include a communication unit configured to receive traveling information from an information providing server, wherein the control unit may receive traveling information for the route searched from the communication unit, detect numbers of intersections per unit distance on the route according to the received traveling information, evaluate a similarity of the numbers of the intersections per unit distance, and set sectors having similar numbers of intersections per unit distance as one sector.

According to this embodiment of the present disclosure, the apparatus may further include a communication unit configured to receive weather information from a weather center, wherein the control unit may receive weather information for the route searched from the communication unit, detect precipitation amounts of the route in accordance with the received weather information, evaluate a similarity of the detected precipitation amounts, and set sectors having similar precipitation amounts as one sector.

According to this embodiment of the present disclosure, the apparatus may further include an output unit configured to output a sound or an image, wherein the control unit may control the output unit to output information about at least one function which is restricted when the sensor unit is deactivated in the power saving driving mode.

According to this embodiment of the present disclosure, the sensor unit may include a plurality of sensor modules, and the control unit may select at least one sensor module to be deactivated among the plurality of sensor modules in the power saving driving module based on the calculated amount of energy.

According to this embodiment of the present disclosure, the apparatus may further include an output unit configured to output a sound or an image, wherein the control unit may control the output unit to output information about at least one function which is restricted when the sensor module to be deactivated is deactivated in the power saving driving mode.

According to this embodiment of the present disclosure, the apparatus may further include an output unit configured to output a sound or an image, wherein the sensor unit may include a plurality of sensor modules, the input unit may designate at least one sensor module among the plurality of sensor modules according to the user's input and input a deactivation signal to the control unit, and the control unit may control the output unit to display at least one sensor module to be deactivated among the plurality of sensor modules in the power saving driving module based on the calculated amount of energy and deactivate at least one of the sensor modules designated according to a signal inputted through the input unit.

According to this embodiment of the present disclosure, the control unit may recalculate a movable distance estimate in consideration of a state of the at least one deactivated sensor module according to the input of the input unit, and when the recalculated movable distance estimate exceeds a distance to the destination, the control unit may calculate an extra amount of energy based on a difference between the movable distance estimate and the distance to the destination, and control the output unit to display one or more functions usable by the calculated extra amount of energy.

A method for controlling energy consumption of a vehicle including an energy supply source according to another embodiment of the present disclosure may include: a first step of receiving an input of a destination; a second step of receiving traveling information; a third step of calculating an amount of energy available from the energy supply source, estimating a movable distance of the vehicle based on the calculated amount of energy, and comparing the estimated movable distance with a distance to the destination to thereby determine whether to activate a power saving driving mode; and a fourth step of searching for a route to a position corresponding to the destination and dividing the route into a plurality of sectors, wherein the power saving driving mode is a mode in which the sensor unit is deactivated in at least one of the plurality of sectors.

According to this embodiment of the present disclosure, the fourth step may include searching for a route to a position corresponding to the destination, detecting one or more vehicle densities according to one or more positions on the route according to the received traveling information, evaluating a similarity of the detected vehicle densities, and setting sectors having similar vehicle densities as one sector.

According to this embodiment of the present disclosure, the fourth step may include searching for a route to a position corresponding to the destination, detecting numbers of intersections per unit distance on the route according to the received traveling information, evaluating a similarity of the numbers of the intersections per unit distance, and setting sectors having similar numbers of intersections per unit distance as one sector.

According to this embodiment of the present disclosure, the method may further include a step of receiving weather information, and the fourth step may include searching for a route to a position corresponding to the destination, detecting precipitation amounts on the route in accordance with the received weather information, evaluating a similarity of the detected precipitation amounts, and setting sectors having similar precipitation amounts as one sector.

According to this embodiment of the present disclosure, the method may further include a step of outputting information about at least one function which is restricted when the sensor unit is deactivated in the power saving driving mode.

According to this embodiment of the present disclosure, the method may further include a step of selecting at least one sensor module to be deactivated among a plurality of sensor modules of the vehicle in the power saving driving module, based on the calculated amount of energy.

According to this embodiment of the present disclosure, the method may further include a step of outputting information about at least one function which is restricted when the sensor module to be deactivated is deactivated in the power saving driving mode.

According to this embodiment of the present disclosure, the method may further include: a fifth step of selecting at least one sensor module to be deactivated among a plurality of sensor modules in the power saving driving module based on the calculated amount of energy, and displaying the selected sensor module; a sixth step of designating at least one sensor module among the plurality of sensor modules, and receiving an input of a signal to deactivate the designated sensor module; and a seventh step of deactivating the at least one sensor module designated according to the signal inputted at the sixth step.

According to this embodiment of the present disclosure, the method may further include: an eighth step of recalculating a movable distance estimate in consideration of a state of the at least one sensor module deactivated at the seventh step; a ninth step of, when the recalculated movable distance estimate exceeds a distance to the destination, calculating an extra amount of energy based on a difference between the movable distance estimate and the distance to the destination; and a tenth step of displaying one or more functions usable by the calculated extra amount of energy.

A computer-readable recording medium having recorded thereon a program for controlling energy consumption of a vehicle including an energy supply source according to still another embodiment of the present disclosure may include a first means configured to receive an input of a destination, a second means configured to sense environment information of an area around the vehicle, a third means configured to calculate an amount of energy available from the energy supply source, estimate a movable distance of the vehicle based on the calculated amount of energy, and compare the estimated movable distance with a distance to the destination to thereby determine whether to activate a power saving driving mode, and a fourth means configured to search for a route to a position corresponding to the destination and divide the route into a plurality of sectors, wherein the power saving driving mode is a mode in which the sensor unit is deactivated in at least one of the plurality of sectors.

Details of other embodiments are included in the detailed description and drawings.

According to embodiments of the present disclosure, by selectively deactivating a vehicle sensor in accordance with the traveling sector, it is possible to ensure that the vehicle can safely reach the destination with the total amount of energy that the vehicle can supply.

According to the embodiment of the present disclosure, when a residual energy amount is generated by the energy saved by the user selection, the user can enhance a desired function by using the residual energy amount generated, thereby providing the user with a preferred traveling environment.

Effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
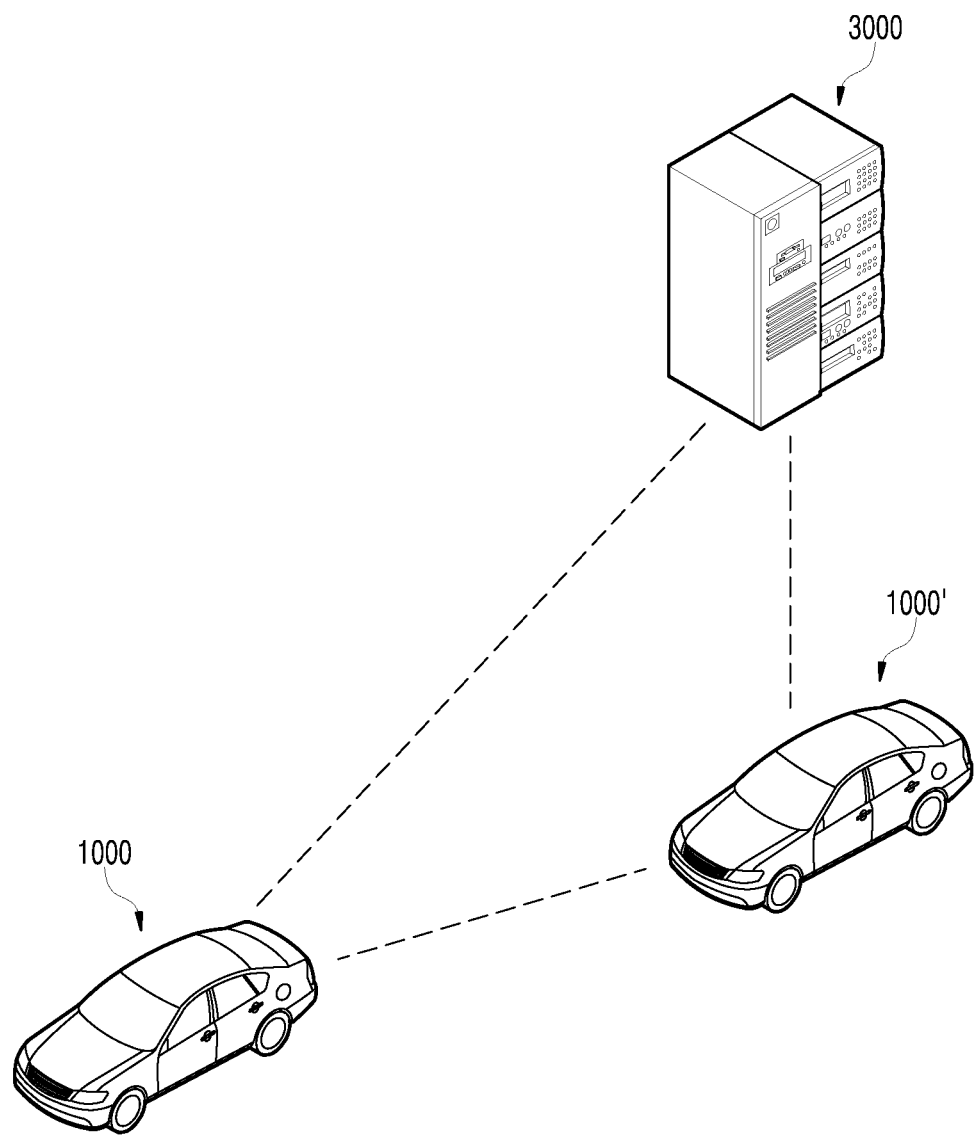
FIG. 1 is a diagram illustrating a system to which an apparatus for controlling energy consumption according to an embodiment of the present disclosure is applied.

Advantages and features of the present disclosure and methods for achieving them will become apparent from the descriptions of embodiments disclosed herein with reference to the accompanying drawings. However, the present disclosure is not limited to the aspects disclosed herein but may be implemented in various different forms. Further, the suffixes "module" and "unit" nitver, the present disclosure is not limited to the aspects is are given or used considering ease of understanding of the specification, and do not have a distinctive meaning or role. The embodiments are provided to make the description of the present disclosure thorough and to fully convey the scope of the present disclosure to those skilled in the art. It is to be understood that the accompanying drawings are used only for easier understanding of the embodiments disclosed in the present specification, and the technical idea disclosed in the present specification is not limited by the accompanying drawings and is intended to cover all modifications, equivalents, and alternatives falling within the spirit and scope of the present disclosure.

In relation to describing the present disclosure, when the detailed description of the relevant known technology is determined to unnecessarily obscure the gist of the present disclosure, the detailed description may be omitted.

Although the terms the present disclosure and the like may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on,n "engaged to,me" connected to,nt or" coupled toto,nt or layer is referred to as being from another used to describe various elements, but the elements are not limited to these terms. without departing from the tecontrast, when an element is referred to as being "directly on,en" directly engaged to,em "directly connected to,ent i" directly coupled toto,ent is referred to as being rom another used to describe various elements, but the elements are not limited to these terms. without en elements should be interpreted in a like fashion (e.g., "betweeny coupled" directly between,to "adjacent between, "directly adjacent,oto,ent is referred to as being ro" and/orly adjacent,oto,ent is referred to as being rom another used to describe various.

The terminology used herein is for the purpose of describing particular example embodiments only and is not intended to be limiting. As used herein, the singular forms the purpose of describing p intended to include the plural forms as well, unless the context clearly indicates otherwise. The terms indicate otherwise. rms the purpose of describing p intended to include the plural forms as well, unless the context would be understood that there are, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

A vehicle described in the present specification may refer to a car, an automobile, and a motorcycle. Hereinafter, the vehicle will be exemplified as an automobile.

The vehicle described in the present specification may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a system to which an apparatus for controlling energy consumption according to an embodiment of the present disclosure is applied.

Referring to FIG. 1, a system to which the apparatus for controlling energy consumption is applied may include a plurality of vehicles 1000 and 1000' and a server 3000.

Depending on the embodiment, the system to which the apparatus for controlling energy consumption is applied may include components other than those shown in FIG. 1 and described below, or may not include some of the components shown in FIG. 1 and described below.

The apparatus for controlling energy according to the embodiment of the present disclosure may be mounted on a vehicle 1000 having wheels rotated by a power source and a steering input device for adjusting a traveling direction. Here, the vehicle 1000 may be an autonomous vehicle.

The apparatus for controlling energy according to the embodiment of the present disclosure may be mounted on a user terminal possessed by a user having the vehicle 1000. Here, the user terminal may be a portable device such as a laptop computer, a mobile phone, a personal digital assistant (PDA), a smart phone, and a multimedia device, or a non-portable device such as a personal computer (PC) or a device mounted on a vehicle.

The vehicle 1000 may receive, from the server 3000, information provided from another vehicle 1000'.

The server 3000 may be, but is not limited to, an information providing server for providing road and traffic information, a weather center for providing weather information, and a server recording energy saving, boosting and driving patterns.

Figure 2:
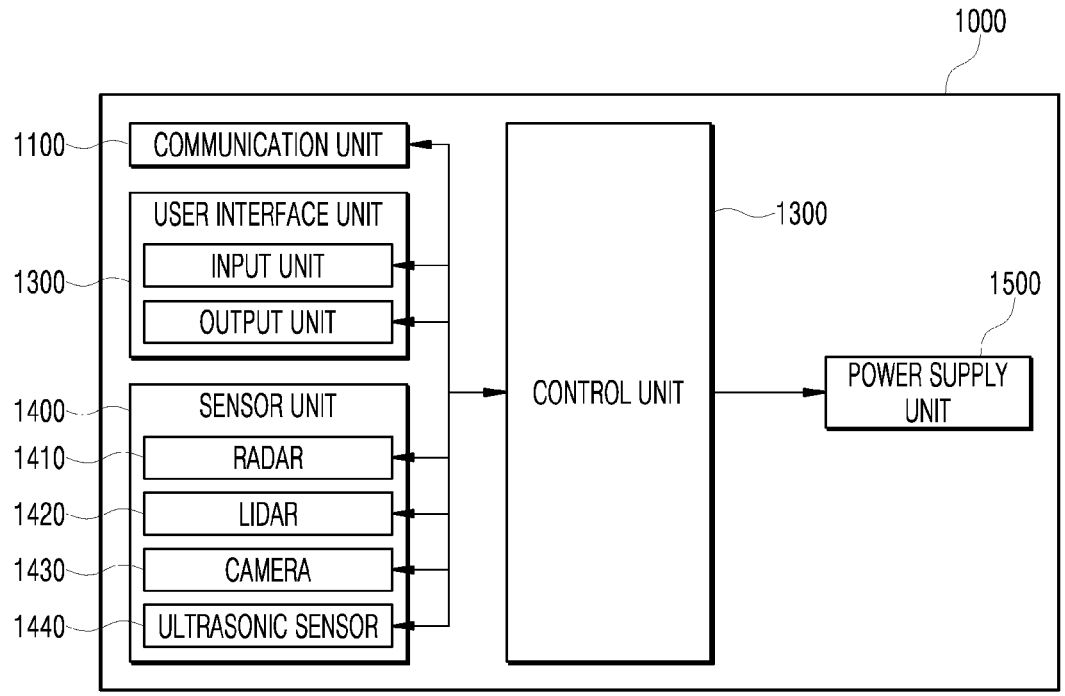
FIG. 2 is a block diagram showing an apparatus for controlling energy consumption which is installed on a vehicle side according to an embodiment of the present disclosure.

FIG. 2 is a block diagram illustrating an apparatus for controlling energy consumption according to an embodiment of the present disclosure.

Referring to FIG. 2, the apparatus for controlling energy may include a communication unit 1100, a control unit 1200, a user interface unit 1300, a sensor unit 1400, and a power supply unit 1500.

Depending on the embodiment, the system to which the apparatus for controlling energy consumption is applied may include components other than those shown in FIG. 2 and described below, or may not include some of the components shown in FIG. 2 and described below.

The vehicle 1000 may be switched from an autonomous mode to a manual mode, or switched from the manual mode to the autonomous mode depending on the driving situation. Here, the driving situation may be judged by at least one of the information received by the communication unit 1100, the external object information detected by the sensor unit 1400, or the navigation information acquired by the navigation module.

The vehicle 1000 may be switched from the autonomous mode to the manual mode, or from the manual mode to the autonomous mode, according to a user input received through the user interface unit 1300.

When the vehicle 1000 is operated in the autonomous mode, the vehicle 1000 may be operated according to the control of the travel module that controls traveling, parking, and unparking operations. When the vehicle 1000 is operated in the manual mode, the vehicle 1000 may be operated by an input of the driver's mechanical driving operation.

The communication unit 1100 is a module for performing communication with an external device. Here, the external device may be another vehicle 1000' or the server 3000.

The communication unit 1100 may receive traveling information from the server 3000, in particular, the information providing server.

The communication unit 1100 may receive weather information from the server 3000, in particular, a weather center.

The communication unit 1100 may transmit a signal including information on energy saving, boosting, and driving patterns to the server 3000, particularly, to the recording server, so that the server 3000 may save history information on energy saving, boosting, and driving patterns.

The communication unit 1100 may include at least one of a transmission antenna, a reception antenna, a radio frequency (RF) circuit capable of implementing various communication protocols, or an RF element in order to perform communication.

The communication unit 1100 may perform short range communication, GPS signal reception, V2X communication, optical communication, broadcast transmission/reception, and intelligent transport systems (ITS) communication functions.

The communication unit 1100 may further support other functions than the functions described, or may not support some of the functions described, depending on the embodiment.

The communication unit 1100 may support short-range communication by using at least one of Bluetooth, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB) technologies.

The communication unit 1100 may form short-range wireless communication networks so as to perform short-range communication between the vehicle 1000 and at least one external device.

The communication unit 1100 may include a Global Positioning System (GPS) module or a Differential Global Positioning System (DGPS) module for acquiring position information of the vehicle 1000.

The communication unit 1100 may include a module for supporting wireless communication between the vehicle 1000 and a server (V2I: vehicle to infrastructure), between the vehicle 100 and another vehicle 1000' (V2V: vehicle to vehicle), or between the vehicle 100 and a pedestrian (V2P: vehicle to pedestrian). That is, the communication unit 1100 may include a V2X communication module. The V2X communication module may include an RF circuit capable of implementing V2I, V2V, and V2P communication protocols.

The communication unit 1100 may receive a danger information broadcast signal transmitted by another vehicle 1000' through the V2X communication module, and may transmit a danger information inquiry signal and receive a danger information response signal in response thereto.

The communication unit 1100 may include an optical communication module for communicating with an external device via light. The optical communication module may include a light transmitting module for converting an electrical signal into an optical signal and transmitting the optical signal to the outside, and a light receiving module for converting the received optical signal into an electrical signal.

The light transmitting module may be formed to be integrated with the lamp included in the vehicle 1000.

The communication unit 1100 may include a broadcast communication module for receiving a broadcast signal from an external broadcast management server through a broadcast channel, or transmitting a broadcast signal to the broadcast management server. The broadcast channel may include a satellite channel and a terrestrial channel. Examples of the broadcast signal may include a TV broadcast signal, a radio broadcast signal, and a data broadcast signal.

The communication unit 1100 may include an ITS communication module for exchanging information, data, or signals with a traffic system. The ITS communication module may provide acquired information and data to the traffic system. The ITS communication module may receive information, data or signals from the traffic system. For example, the ITS communication module may receive road traffic information from the traffic system, and provide the information to the control unit 1200. For example, the ITS communication module may receive a control signal from the traffic system, and provide the control signal to the control unit 1200 or a processor provided in the vehicle 1000.

Depending on the embodiment, the overall operation of each module of the communication unit 1100 may be controlled by a separate processor provided in the communication unit 1100. The communication unit 1100 may include a plurality of processors, or may not include a processor. When the communication unit 1100 does not include a processor, the communication unit 1100 may be operated under the control of the processor of another device in the vehicle 100 or the control unit 1200.

The communication unit 1100 may implement a vehicle display device together with the user interface unit 1300. In this case, the vehicle display device may be referred to as a telematics device or an audio video navigation (AVN) device.

The communication unit 1100 may transmit specific information to the 5G network when the vehicle 1000 is operated in the autonomous mode.

The specific information may include autonomous driving related information.

The autonomous driving related information may be information directly related to the running control of the vehicle. For example, the autonomous driving related information may include at least one of object data indicating an object around the vehicle, map data, vehicle state data, vehicle position data, and driving plan data.

The autonomous driving related information may further include service information necessary for autonomous driving. For example, the specific information may include information about the destination and the stability level of the vehicle, which are inputted through the user interface unit 1300.

Figure 3:
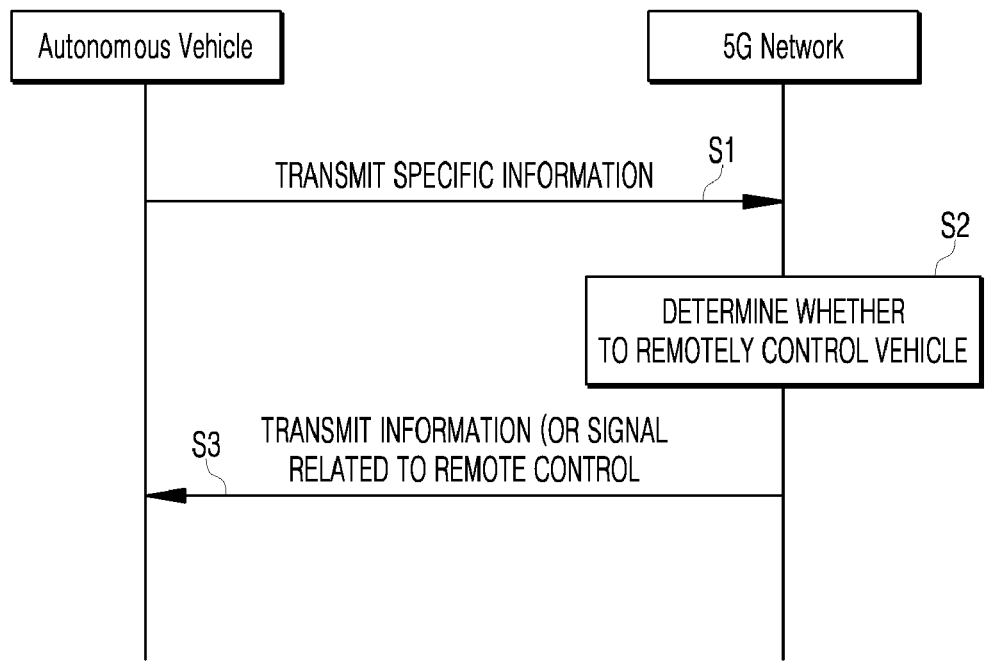
FIG. 3 is a diagram showing an example of the basic operation of an autonomous vehicle and a 5G network in a 5G communication system.
Figure 4:
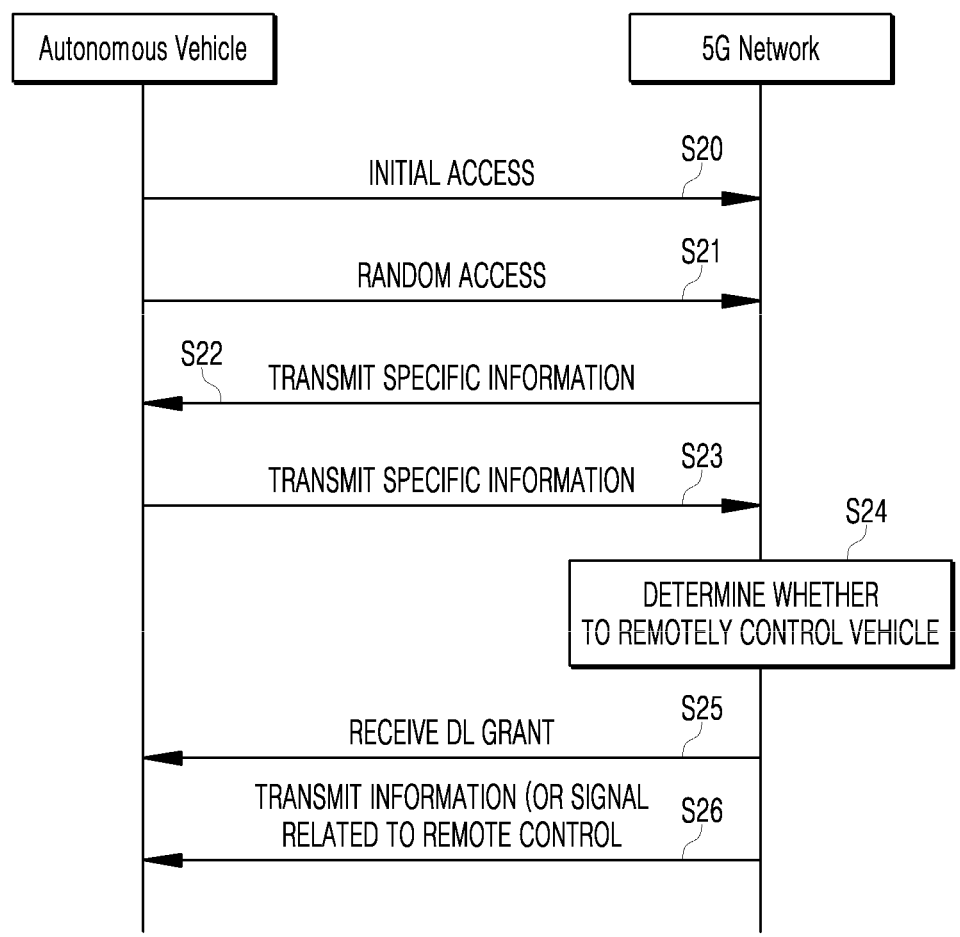
FIG. 4 is a diagram showing an example of an applied operation of an autonomous vehicle and a 5G network in a 5G communication system.
Figure 5:
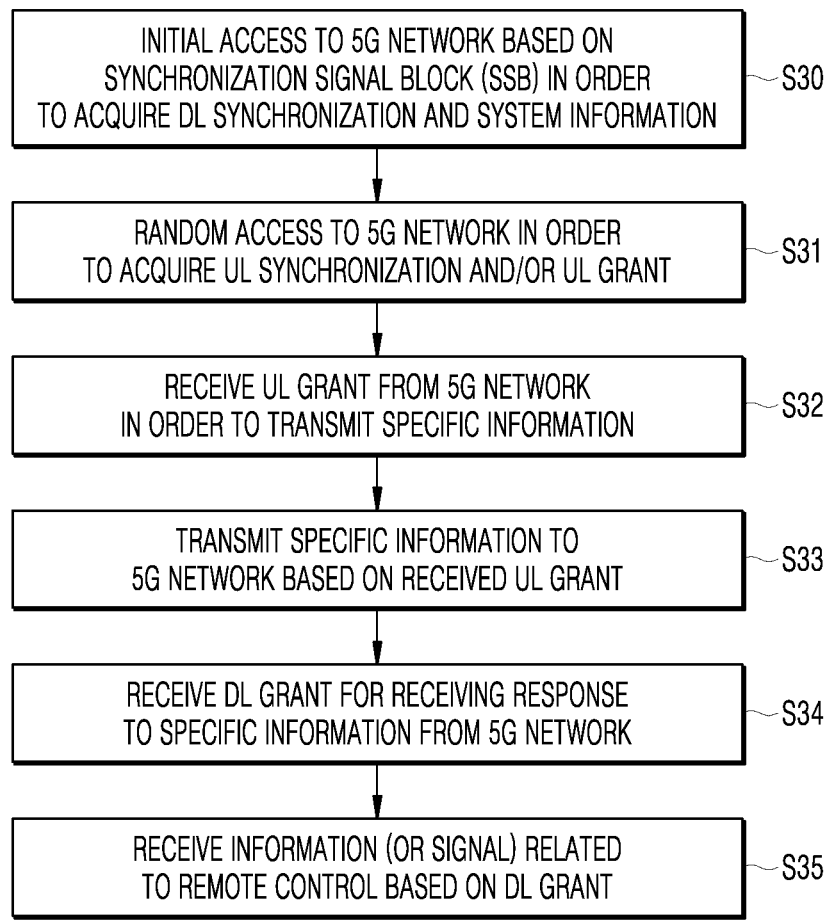
FIGS. 5 to 8 are diagrams showing an example of the operation of an autonomous vehicle using a 5G communication.

FIG. 3 is a diagram showing an example of the basic operation of an autonomous vehicle and a 5G network in a 5G communication system.

The 5G network may transmit information (or signals) related to the remote control to the autonomous vehicle (S1).

In addition, the 5G network may determine whether the vehicle is remotely controlled (S2).

Here, the 5G network may include a server or a module that performs autonomous driving related remote control.

The 5G network may transmit information (or signals) related to the remote control to the autonomous vehicle (S3).

As described above, the information related to the remote control may be a signal directly applied to the autonomous vehicle, and may further include service information required for autonomous driving. In one embodiment of the present disclosure, the autonomous vehicle can provide autonomous driving related services by receiving service information such as insurance and danger sector information selected on a route through a server connected to the 5G network.

Hereinafter, FIGS. 4 to 8 schematically illustrate an essential process for 5G communication between an autonomous vehicle and a 5G network (for example, an initial access procedure between the vehicle and the 5G network, etc.) in order to provide the operation of deactivating the sensor unit 1400 by sectors in the autonomous driving process according to an embodiment of the present disclosure.

A necessary procedure for 5G communication between the autonomous vehicle 1000 and the 5G network (for example, an initial access procedure between the vehicle 1000 and the 5G network, etc.) will be schematically described as follows.

First, an example of the application operation through the 5G network and the autonomous vehicle 1000 performed in the 5G communication system is as follows.

The vehicle 1000 performs an initial access procedure with the 5G network (S20). In this case, the initial access procedure includes a cell search process for acquiring downlink (DL) synchronization and a process for acquiring system information.

In addition, the vehicle 1000 performs a random access procedure with the 5G network (S21). At this time, the random access procedure includes an uplink (UL) synchronization acquisition process or a preamble transmission process for UL data transmission, a random access response reception process, and the like.

Meanwhile, the 5G network transmits an uplink grant for scheduling transmission of specific information to the autonomous vehicle 1000 (S22).

The procedure by which the vehicle 1000 receives the UL grant includes a scheduling process in which a time/frequency resource is allocated for transmission of UL data to the 5G network.

In addition, the autonomous vehicle 1000 may transmit specific information to the 5G network based on the UL grant (S23).

The 5G network may determine whether to remotely control the vehicle 1000 based on the specific information transmitted from the vehicle 1000 (S24).

In addition, the autonomous vehicle 1000 may receive the DL grant through a physical downlink control channel in order to receive a response to specific information transmitted from the 5G network (S25).

Thereafter, the 5G network may transmit information (or signals) related to the remote control to the autonomous vehicle 1000 based on the DL grant (S26).

Although a combined procedure of an initial access process and/or arbitrary receiving process of the autonomous vehicle 1000 and the 5G network, and a DL grant receiving process was illustrated, the present disclosure is not limited to this example.

For example, an initial access procedure and/or a random access procedure may be performed through an initial access step, an UL grant reception step, a specific information transmission step, a remote control decision step of the vehicle, and an information transmission step associated with remote control. Further, an initial access procedure and/or a random access procedure may be performed through a random access step, an UL grant reception step, a specific information transmission step, a remote control decision step of the vehicle, and an information transmission step associated with remote control. In addition, the autonomous vehicle 1000 may be controlled in a manner that combines an AI operation with a DL grant receiving process through a step of transmitting specific information, a step of determining whether to remotely control the vehicle, a step of receiving a DL grant, and a step of transmitting information related to remote control.

In addition, the operation of the above-described autonomous vehicle 1000 is merely exemplary, and the present disclosure is not limited thereto.

For example, the operation of the autonomous vehicle 1000 may be performed by selectively combining an initial access step, an arbitrary access step, an UL grant receiving step, or a DL grant receiving step, with a step of transmitting specific information and a step of transmitting information related to remote control. In addition, the operation of the autonomous vehicle 1000 may be composed of a random access step, an UL grant reception step, a specific information transmission step, and an information transmission step associated with the remote control. The operation of the autonomous vehicle 1000 may consist of an initial access step, a random access step, a specific information transmission step, and an information transmission step associated with the remote control. In addition, the operation of the autonomous vehicle 1000 may be composed of an UL grant reception step, a specific information transmission step, a DL grant reception step, and an information transmission step associated with the remote control.

The vehicle 1000 including an autonomous driving module may perform the initial access procedure with the 5G network based on the synchronization signal block (SSB) in order to obtain DL synchronization and system information (S30).

In addition, the autonomous vehicle 1000 may perform a random access procedure with the 5G network for UL synchronization acquisition and/or UL transmission (S31).

The autonomous vehicle 1000 may receive the UL grant from the 5G network in order to transmit specific information (S32).

In addition, the autonomous vehicle 1000 transmits specific information to the 5G network based on the UL grant (S33).

Further, the autonomous vehicle 1000 receives the DL grant for receiving the response to the specific information from the 5G network (S34).

In addition, the autonomous vehicle 1000 receives information (or signals) related to the remote control from the 5G network based on the DL grant (S35).

Beam Management (BM) may be added to the initial access step, a beam failure recovery process associated with Physical Random Access Channel (PRACH) transmission may be added to the random access step, a QCL (Quasi Co-Located) relation may be added to the UL grant reception step with respect to a beam receiving direction of a Physical Downlink Control Channel (PDCCH) including an UL grant, and a QCL relation may be added to the specific information transmission step with respect to the beam transmission direction of the Physical Uplink Control Channel (PUCCH)/Physical Uplink Shared Channel (PUSCH) including specific information. Further, a QCL relationship may be added to the DL grant reception step with respect to the beam receiving direction of the PDCCH including the DL grant.

Figure 6:
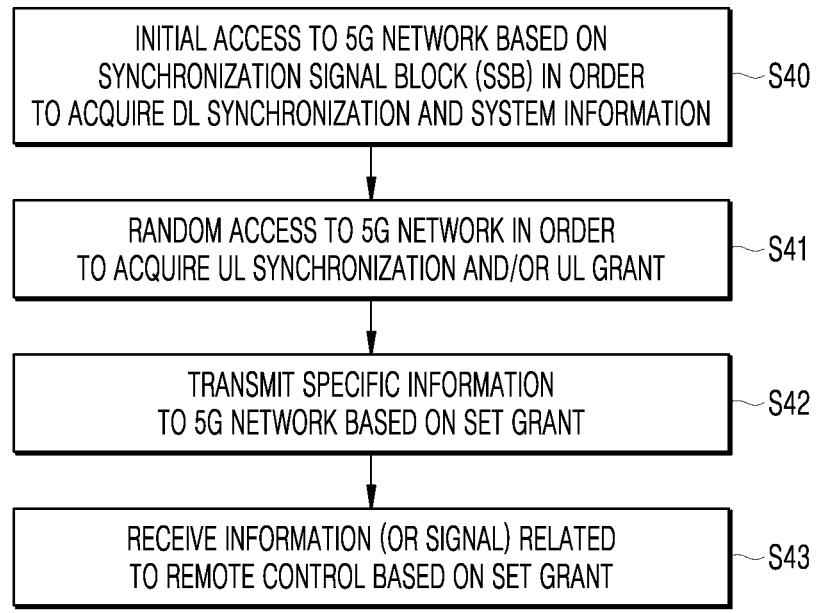

As shown in FIG. 6, the autonomous vehicle 1000 performs an initial access procedure with the 5G network based on the SSB in order to obtain DL synchronization and system information (S40).

In addition, the autonomous vehicle 1000 may perform a random access procedure with the 5G network for UL synchronization acquisition and/or UL transmission (S41).

In addition, the autonomous vehicle 1000 transmits specific information to the 5G network based on the configured grant (S42). In other words, instead of receiving the UL grant from the 5G network, the configured grant may be received.

In addition, the autonomous vehicle 1000 receives information (or signals) related to the remote control from the 5G network based on the configured grant (S43).

Figure 7:
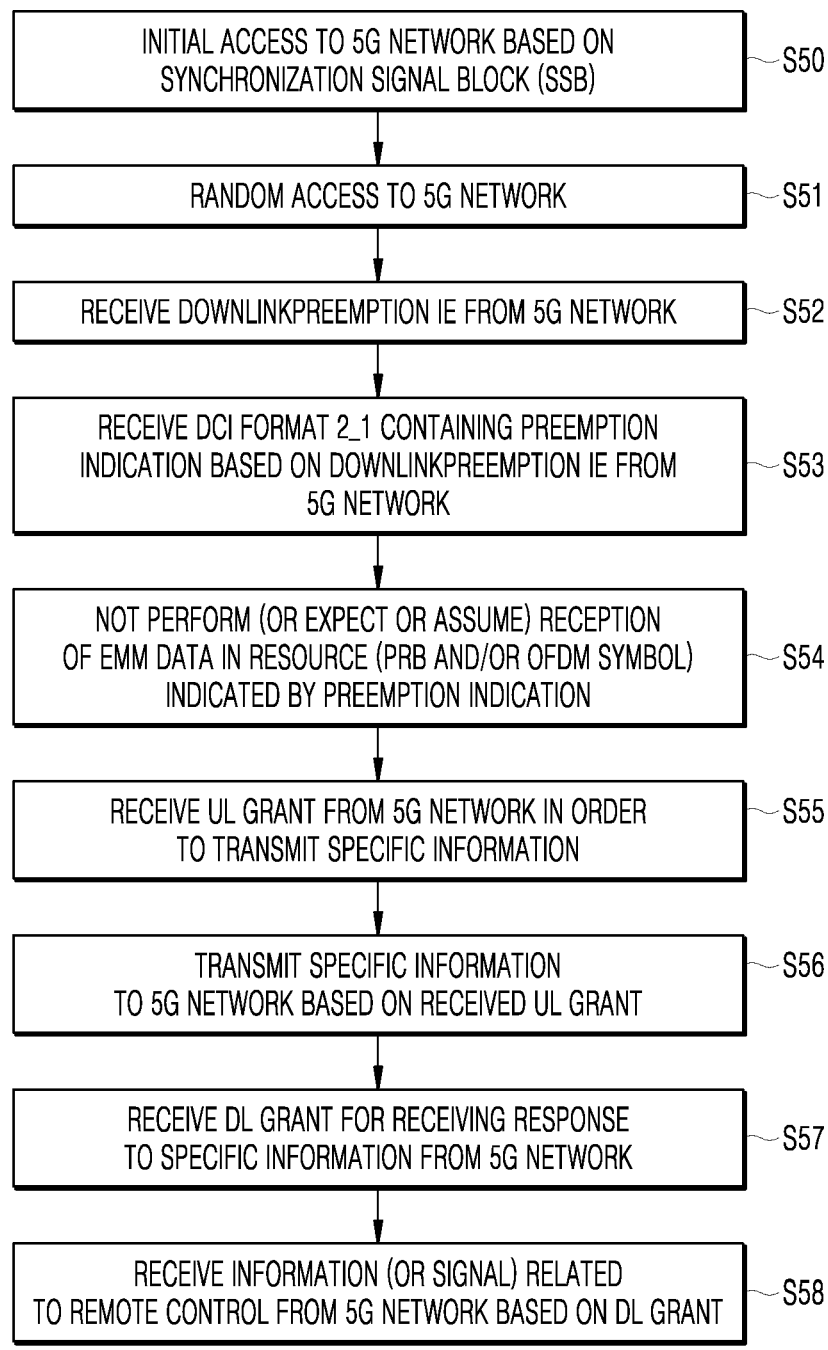

As shown in FIG. 7, the autonomous vehicle 1000 performs an initial access procedure with the 5G network based on the SSB in order to obtain DL synchronization and system information (S50).

In addition, the autonomous vehicle 1000 may perform a random access procedure with the 5G network for UL synchronization acquisition and/or UL transmission (S51).

In addition, the autonomous vehicle 1000 receives a downlink preemption information element (IE) from the 5G network (S52).

In addition, the autonomous vehicle 1000 receives the Downlink Control Information (DCI) format 2_1 including the preemption indication from the 5G network based on the DL preemption IE (S53).

In addition, the autonomous vehicle 1000 does not perform (or expect or assume) reception of eMBB data in the resource (PRB and/or OFDM symbol) indicated by the preemption indication (S54).

In addition, the autonomous vehicle 1000 receives the UL grant in the 5G network in order to transmit specific information (S55).

In addition, the autonomous vehicle 1000 transmits specific information to the 5G network based on the UL grant (S56).

Further, the autonomous vehicle 1000 receives the DL grant for receiving the response to the specific information from the 5G network (S57).

In addition, the autonomous vehicle 1000 receives information (or signals) related to the remote control from the 5G network based on the DL grant (S58).

Figure 8:
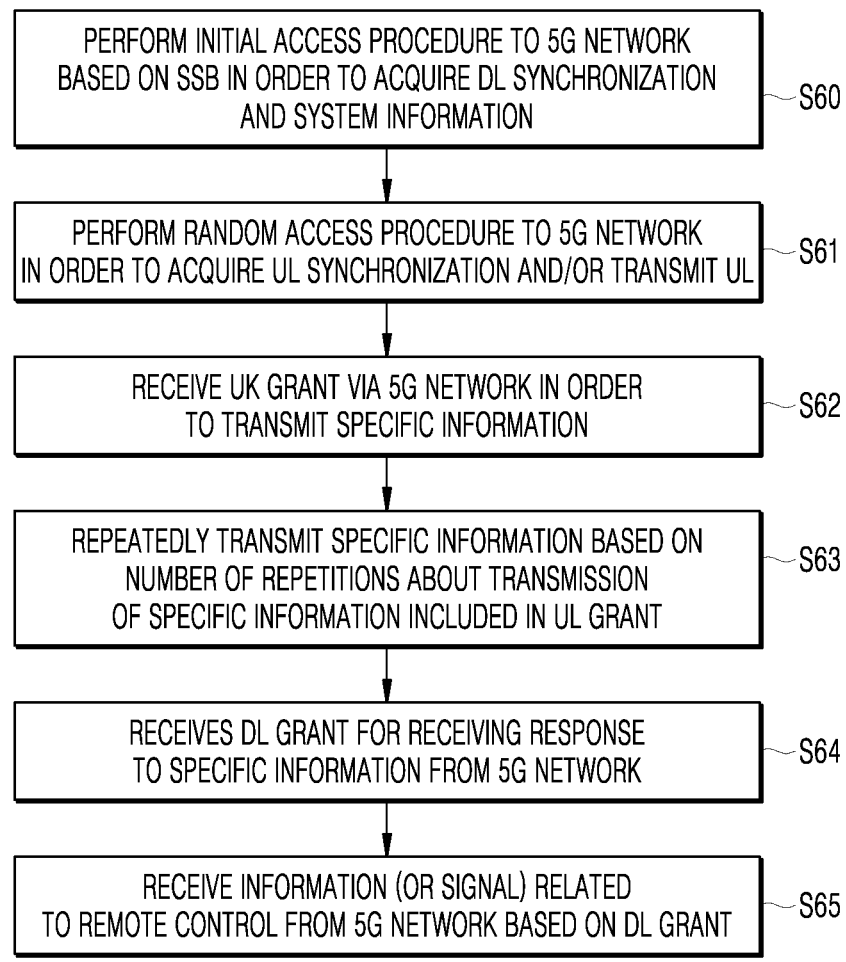

As shown in FIG. 8, the autonomous vehicle 1000 performs an initial access procedure with the 5G network based on the SSB in order to obtain DL synchronization and system information (S60).

In addition, the autonomous vehicle 1000 may perform a random access procedure with the 5G network for UL synchronization acquisition and/or UL transmission (S61).

In addition, the autonomous vehicle 1000 receives the UL grant in the 5G network in order to transmit specific information (S62).

When transmission of specific information is repeatedly performed, the information on the number of repetitions is included, and the specific information is repeatedly transmitted based on the information on the number of repetitions (S63).

In addition, the autonomous vehicle 1000 transmits specific information to the 5G network based on the UL grant.

Also, the repetitive transmission of specific information may be performed through frequency hopping, the first specific information may be transmitted in the first frequency resource, and the second specific information may be transmitted in the second frequency resource.

Specific information can be transmitted through a narrow band of 6 resource blocks (RB) or 1 resource block (RB).

Further, the autonomous vehicle 1000 receives the DL grant for receiving the response to the specific information from the 5G network (S64).

In addition, the autonomous vehicle 1000 receives information (or signals) related to the remote control from the 5G network based on the DL grant (S65).

The above-described 5G communication technology may be applied in combination with the embodiments proposed in this specification, which will be described later with reference to FIGS. 1 to 12, or may be supplemented to specify or clarify the technical features of the embodiments proposed in this specification.

The vehicle 1000 is connected to an external server through a communication network, and is capable of moving along a predetermined route without driver intervention using the autonomous driving technology.

In the following embodiments, the user may be interpreted as a driver, a passenger, or the owner of a user terminal.

When the vehicle 1000 is traveling in the autonomous mode, the type and frequency of accidents may vary greatly depending on the ability to sense the surrounding risk factors in real time. The route to the destination may include sectors having different levels of risk due to various causes such as weather, terrain characteristics, traffic congestion, and the like.

At least one of the autonomous vehicle, the user terminal, or the server of the present disclosure may be linked to or integrated with an artificial intelligence module, a drone (an unmanned aerial vehicle, UAV), a robot, an augmented reality (AR), a virtual reality (VR), and a device related to 5G services.

For example, the vehicle 1000 may operate in association with at least one AI module or robot included in the vehicle 1000, during autonomous driving.

For example, the vehicle 1000 may interact with at least one robot. The robot may be an autonomous mobile robot (AMR). The mobile robot is capable of moving by itself, may freely move, and may be equipped with a plurality of sensors so as to be capable of avoiding obstacles during traveling. The mobile robot may be a flying robot (for example, a drone) having a flight device. The mobile robot may be a wheeled robot having at least one wheel and moving by means of the rotation of the wheel. The mobile robot may be a legged robot having at least one leg and being moved using the leg.

The robot may function as a device that complements the convenience of a vehicle user. For example, the robot may perform a function of moving a load placed on the vehicle 1000 to the final destination of the user. For example, the robot may perform a function of guiding the user, who has alighted from the vehicle 1000, to the final destination. For example, the robot may perform a function of transporting the user, who has alighted from the vehicle 1000, to the final destination.

At least one electronic device included in the vehicle 1000 may communicate with the robot through a communication device.

At least one electronic device included in the vehicle 1000 may provide the robot with data processed by at least one electronic device included in the vehicle. For example, at least one electronic device included in the vehicle 1000 may provide the robot with at least one of object data indicating an object around the vehicle, HD map data, vehicle state data, vehicle position data, or driving plan data.

At least one electronic device included in the vehicle 1000 can receive data processed by the robot from the robot. At least one electronic device included in the vehicle 1000 can receive at least one of sensing data, object data, robot state data, robot position data, and movement plan data of the robot, which are generated by the robot.

At least one electronic device included in the vehicle 1000 may generate a control signal based on data received from the robot. For example, at least one electronic device included in the vehicle may compare the information about the object generated by the object detection device with the information about the object generated by the robot, and generate a control signal based on the comparison result. At least one electronic device included in the vehicle 1000 may generate a control signal so as to prevent interference between the route of the vehicle and the route of the robot.

At least one electronic device included in the vehicle 1000 may include a software module or a hardware module (hereinafter referred to as an artificial intelligence module) that implements artificial intelligence (AI). At least one electronic device included in the vehicle may input the acquired data to the AI module, and use the data which is outputted from the AI module.

The artificial intelligence module may perform machine learning on input data using at least one artificial neural network (ANN). The artificial intelligence module may output driving plan data through machine learning on the input data.

At least one electronic device included in the vehicle 1000 can generate a control signal based on data which is output from the AI module.

At least one electronic device included in the vehicle 1000 may receive data processed by artificial intelligence, from an external device, via a communication device, depending on the embodiment. At least one electronic device included in the vehicle 1000 may generate a control signal based on data processed by artificial intelligence.

The control unit 1200 may calculate the amount of energy that can be supplied from the energy supply source of the vehicle 1000, estimate the movable distance of the vehicle 1000 based on the calculated amount of energy, and determine whether to activate the power saving driving mode by comparing the estimated movable distance with the distance to the destination. At this time, the energy supply source may be a battery inside the vehicle 1000.

The control unit 1200 may control the vehicle 1000 to travel according to the remote control signal received from the 5G network based on the DL grant when the estimated movable distance of the vehicle 1000 exceeds the distance to the destination.

The control unit 1200 may search for a route to a location corresponding to the destination, and divide the searched route into a plurality of sectors. At this time, the power saving driving mode may be a mode in which the sensor unit 1400 is deactivated in at least one of the divided sectors.

The control unit 1200 may receive traveling information for the route searched from the communication unit 1100, detect vehicle densities according to the position of the route according to the provided traveling information, evaluate the similarity of the detected vehicle densities, and set sectors having similar vehicle densities as one sector.

The control unit 1200 may receive traveling information for the route searched from the communication unit 1100, detect the number of intersections per unit distance of the route according to the provided traveling information, evaluate the similarity of the number of the intersections per unit distance, and set sectors having similar numbers of intersections per unit distance as one sector.

The control unit 1200 may receive weather information for the route searched from the communication unit 1100, detect precipitation amounts of the route according to the received weather information, evaluate the similarity of the detected precipitation amount, and set sectors having similar precipitation amounts as one sector.

The control unit 1200 may collect traveling information and weather information from the server 3000 through the communication unit 1100, and divide the sector of the route according to geographical and weather characteristics based on the collected information.

For example, the control unit 1200 may divide the route into urban sectors and suburban sectors. That is, the control unit 1200 may measure the number of moving objects to be sensed per unit distance, the number of traffic lights per unit distance, the number of acceleration/deceleration sectors per unit distance, and the vehicle density per unit area, to thereby be used as criteria for division. If there are ten or more intersections with traffic lights within a unit distance of 5 km, the control unit 1200 may set the route as a separate sector.

The control unit 1200 may divide the route into sectors according to the road type. That is, the control unit 1200 may check the number of roundabouts per unit distance, the number of curves per unit distance, the number of steep slopes per unit distance, the ratio of unpaved roads per unit distance, the average width of road per unit distance, and the number of junction sections per unit distance, and use these as criteria for division. If there are three or more roundabouts within a unit distance of 1 km, the control unit 1200 may set the route as a separate sector.

The control unit 1200 may divide the route into sectors according to the weather. That is, the control unit 1200 may check the change in the position of the sun, whether it is day or night, the precipitation, and the temperature according to the traveling direction, and use the checked information as criteria for division of the route. In the case of a route of traveling toward the west at sunset, it may be difficult to secure a view due to glare, and therefore the control unit 1200 may set the route as a separate sector.

The control unit 1200 may output information on a function that is restricted when the sensor unit 1400 is deactivated during the power saving driving mode through the output module of the user interface unit 1300.

The control unit 1200 may inform the driver of information on how to safely drive when the sensor unit 1400 is deactivated in a manual traveling sector selected by the user through the user interface unit 1300.

The control unit 1200 may determine a risk that may be caused by the limited function by deactivating the sensor unit 1400 based on the road and traffic information provided from the server 3000, and inform the user of the risk as an element of caution according to road and geographical characteristics. Since the function of detecting objects around the vehicle 100 is restricted when a lidar 1420 of the sensor unit 1400 is deactivated, the control unit 1200 may inform the user of information about an area or sector where there are wild animals and blind corners before entering the area or sector, based on the road and traffic information provided from the server 3000.

The control unit 1200 may inform the user of the functions restricted by deactivating the sensor unit 1400. When a camera 1430, particularly the front camera, of the sensor unit 1400 is deactivated, the control unit 1200 may inform the user of information indicating that the vehicle 1000 itself cannot detect objects and traffic lights.

The control unit 1200 may determine the risk that may be caused by the limited function by deactivating the sensor unit 1400 based on driver propensity information stored in advance in the storage module, and inform the user of information on the risk so as to help the user to safely drive in the manual traveling mode in the selected sector. Here, the driver propensity information includes information indicating the driving propensity of the driver, generated based on, for example, revolutions per minute (RPM), a daily driving distance, driving speed, rapid braking, and quick starting, which have been periodically detected at the time of driving. When a long distance radar 1410 of the sensor unit 1400 is deactivated, the function of detecting an object (including another other vehicle ahead of the vehicle 1000) is restricted. Hence, the control unit 1200 may provide the user with information indicating that it is necessary to secure a sufficient following distance when entering the sector in the city based on the road and traffic information provided from the server 3000.

In order to supplement the danger sensing function limited by the deactivation of the predetermined sensor module of the sensor unit 1400 during the power saving driving mode, the control unit 1200 may infer a dangerous situation by using the remaining active sensor modules of the sensor unit 1400, or may query another vehicle 1000' through the V2X communication module of the communication unit 1100, and infer a dangerous situation by receiving a notification signal including information on the query.

The control unit 1200 may select a sensor module that needs to be deactivated among a plurality of sensor modules in the sensor unit 1400 in the power saving driving mode based on the calculated energy amount.

The control unit 1200 determines a sensor module that may be deactivated among the plurality of sensor modules in the sensor unit 1400 in the power saving driving mode, and provides the user with an input means through which the user can select deactivation of the sensor module determined for each sector segmented as described above through the user interface unit 1300. The control unit 1200 may provide the input means for selecting deactivation through the user interface unit 1300 for the convenience of user input, and may provide information on the total amount of energy essentially required to be reduced, sensor modules which can be deactivated per sector, and the amount of energy saved when each of the sensor modules is deactivated.

When it is necessary to operate in the power saving driving mode in order to reach the destination inputted by the user based on the amount of energy that can be supplied from the energy supply source of the vehicle 1000, the control unit 1200 may display at least one sensor module to be deactivated among the plurality of sensor modules of the sensor unit 1400 through the output module of the user interface unit 1300, and deactivate the designated at least one sensor module according to the signal inputted through the input module of the user interface unit 1300.

The control unit 1200 may recalculate the movable distance estimate by using the amount of energy which can be supplied from the energy supply source of the vehicle by reflecting the state of at least one sensor module of the sensor unit 1400 which has been deactivated according to the input of the input module of the user interface unit 1300, and if the recalculated movable distance estimate exceeds the distance to the destination, the control unit 1200 may calculate the extra amount of energy based on the difference between the movable distance estimate and the distance to the destination, and display the functions that can be used by using the calculated extra amount of energy through the output module of the user interface unit 1300.

When an extra amount of energy is generated in the power saving driving mode, the control unit 1200 may determine at least one function which can be reinforced among the functions of the vehicle 100, for example, an in-vehicle temperature reduction function through an air conditioner or an in-vehicle temperature increase function through a heating device, and may provide the user of the vehicle 1000 with an input means through which the user can select a reinforcement function for each sector divided through the user interface unit 1300 as described above. The control unit 1200 may provide an input means for a function that has been reinforced through the user interface unit 1300 for the convenience of user input. In addition, the control unit 1200 may provide the user with information on the total extra amount of energy that can be used for reinforcement of functions, functions that can be reinforced for individual sectors, and the amount of energy which may be used according to the reinforcement of each of the functions. The control unit 1200 may display a function suitable to the user based on driving information or weather information, among functions that may be reinforced according to the extra amount of energy, such as a function of reducing the pulse period of the long distance radar 1410 for the use of an adaptive cruise control (ACC) function in a sector where there is a lot of rain.

The control unit 1200 may be implemented by using at least one of an application specific integrated circuit (ASIC), a digital signal processor (DSP), a digital signal processing device (DSP), a programmable logic device (PLD), a field programmable gate array (FPGA), a processor, a control unit, a micro-control unit, a microprocessor, or other electronic units for performing other functions.

The user interface unit 1300 is used for communication between the vehicle 1000 and the vehicle user. The user interface unit 1300 may receive an input signal of the user, transmit the received input signal to the control unit 1200, and provide information held by the vehicle 1000 to the user by the control of the control unit 1200. The user interface unit 1300 may include, but is not limited to, an input module, an internal camera, a bio-sensing module, and an output module.

The input module is for receiving information from a user. The data collected by the input module may be analyzed by the control unit 1200 and processed by the user's control command.

The input module may receive the destination of the vehicle 1000 from the user and provide the destination to the control unit 1200.

The input module may input to the control unit 1200 a signal for designating and deactivating at least one of the plurality of sensor modules of the sensor unit 1400 according to the user's input.

The input module may be disposed inside the vehicle. For example, the input module may be disposed on one area of a steering wheel, one area of an instrument panel, one area of a seat, one area of each pillar, one area of a door, one area of a center console, one area of a head lining, one area of a sun visor, one area of a windshield, or one area of a window.

The output module is for generating an output related to visual, auditory, or tactile information. The output module may output a sound or an image.

The output module may include at least one of a display module, an acoustic output module, and a haptic output module.

The display module may display graphic objects corresponding to various information.

The display module may include at least one of a liquid crystal display (LCD), a thin film transistor liquid crystal display (TFT LCD), an organic light-emitting diode (OLED), a flexible display, a 3D display, or an e-ink display.

The display module may have a mutual layer structure with a touch input module, or may be integrally formed to implement a touch screen.

The display module may be implemented as a Head Up Display (HUD). When the display module is implemented as an HUD, the display module may include a projection module to output information through an image projected onto a windshield or a window.

The display module may include a transparent display. The transparent display may be attached to the windshield or the window.

The transparent display may display a predetermined screen with a predetermined transparency. The transparent display may include at least one of a transparent thin film electroluminescent (TFEL), a transparent organic light-emitting diode (OLED), a transparent liquid crystal display (LCD), a transmissive transparent display, or a transparent light emitting diode (LED). The transparency of the transparent display may be adjusted.

The user interface unit 1300 may include a plurality of display modules.

The display module may be disposed on one area of a steering wheel, one area of an instrument panel, one area of a seat, one area of each pillar, one area of a door, one area of a center console, one area of a head lining, or one area of a sun visor, or may be implemented on one area of a windshield or one area of a window.

The sound output module may convert an electric signal provided from the control unit 1200 into an audio signal, and output the audio signal. To this end, the sound output module may include one or more speakers.

The haptic output module generates a tactile output. For example, the haptic output module may operate to allow the user to perceive the output by vibrating a steering wheel, a seat belt, and a seat.

The sensor unit 1400 is for detecting an object located outside the vehicle 1000. The sensor unit 1400 may generate object information based on the sensing data, and transmit the generated object information to the control unit 1200. Here, the object may include various objects related to the driving of the vehicle 1000, such as a lane, another vehicle 1000', a pedestrian, a motorcycle, a traffic signal, a light, a road, a structure, a speed bump, a landmark, and an animal.

The sensor unit 1400 may include a plurality of sensor modules such as a radio detection and ranging (radar) 1410, a light imaging detection and ranging (lidar) 1420, a camera 1430, an ultrasonic sensor 1440, and an infrared sensor.

The sensor unit 1400 may sense environmental information around the vehicle 1000 through a plurality of sensor modules.

Depending on the embodiment, the sensor unit 1400 may further include components other than the components described, or may not include some of the components described.

The radar 1410 may include an electromagnetic wave transmitting module and an electromagnetic wave receiving module. The radar 1410 may be implemented by a pulse radar system or a continuous wave radar system in terms of the radio wave emission principle. The radar 1410 may be implemented by a frequency modulated continuous wave (FMCW) scheme or a frequency shift keying (FSK) scheme among continuous wave radar schemes, depending on the signal waveform.

The radar 1410 may detect an object based on a time-of-flight (TOF) scheme or a phase-shift scheme by using an electromagnetic wave as a medium, and may detect the position of the detected object, the distance to the detected object, and a relative speed.

The radar 1410 may be disposed at an appropriate location outside the vehicle in order to sense objects located at the front, rear, or side portions of the vehicle.

The lidar 1420 may include a laser transmitting module and a laser receiving module. The lidar 1420 may be implemented in a Time of Flight (TOF) scheme or a phase-shift scheme.

The lidar 1420 may be implemented as a driven type or a non-driven type.

When implemented as a driven type, the lidar 1420 may be rotated by the motor and is capable of detecting objects around the vehicle 1000, and when implemented as a non-driven type, the lidar 1420 may detect objects located within a predetermined range with respect to the vehicle 1000. The vehicle 1000 may include a plurality of non-driven type lidars.

The lidar 1420 may detect an object based on a time-of-flight (TOF) scheme or a phase-shift scheme by using a laser beam as a medium, and may detect the position of the detected object, the distance from the detected object, and relative speed of the detected object.

The lidar 1420 may be disposed at an appropriate location outside the vehicle in order to sense objects located at the front, rear, or side portions of the vehicle.

The camera 1430 may be located at an appropriate location outside the vehicle in order to obtain an external image of the vehicle. The camera 1430 may be a mono camera, a stereo camera, an Around View Monitoring (AVM) camera, or a 360 degree camera.

The camera 1430 may be placed close to the front windshield in the interior of the vehicle in order to obtain an image of the front side of the vehicle. Alternatively, the camera 1430 may be disposed around a front bumper or a radiator grill.

The camera 1430 may be placed close to the rear glass in the interior of the vehicle in order to obtain an image of the rear side of the vehicle. Alternatively, the camera 1430 may be disposed around a rear bumper, trunk, or tailgate.

The camera 1430 may be disposed close to at least one of the side windows in the interior of the vehicle in order to obtain an image of the side of the vehicle. Alternatively, the camera 1430 may be disposed around a side mirror, fender, or door.

The camera 1430 can provide the acquired image to the control unit 1200.

The ultrasonic sensor 1440 may include an ultrasonic transmission module and an ultrasonic reception module. The ultrasonic sensor 1440 may detect an object based on the ultrasonic wave, and may detect the position of the detected object, the distance to the detected object, and the relative speed of the detected object.

The ultrasonic sensor 1440 may be disposed at an appropriate location outside the vehicle in order to sense objects located at the front, rear, or side portions of the vehicle.

The infrared sensor may include an infrared transmission module and an infrared reception module. The infrared sensor 1440 may detect an object based on infrared light, and detect the position of the detected object, the distance from the detected object, and the relative speed of the detected object.

The infrared sensor may be disposed at an appropriate location outside the vehicle in order to sense objects located at the front, rear, or side portions of the vehicle.

The control unit 1200 may control the overall operation of each module of the sensor unit 1400.

The control unit 1200 may detect or classify objects by comparing data sensed by the radar 1410, the lidar 1420, the ultrasonic sensor 1440, and the infrared sensor with pre-stored data.

The control unit 1200 may detect and track objects based on the acquired image. The control unit 1200 may perform operations such as calculating a distance to an object and calculating a relative speed with respect to the object through an image processing algorithm.

For example, the control unit 1200 may acquire information on the distance to the object and information on the relative speed with respect to the object on the basis of variation of the object size with time in the acquired image.

For example, the control unit 1200 may obtain information on the distance to the object and information on the relative speed through, for example, a pin hole model and road surface profiling.

The control unit 1200 may detect and track the object based on the reflected electromagnetic wave that is reflected by the object and returned to the object after being transmitted. The control unit 1200 may perform operations such as calculating a distance to an object and calculating a relative speed of the object based on the electromagnetic wave.

The control unit 1200 may detect and track the object based on the reflected laser beam that is reflected by the object and returned to the object after being transmitted. The control unit 1200 may perform operations such as calculating a distance to an object and calculating a relative speed of the object based on the laser beam.

The control unit 1200 may detect and track the object based on the reflected ultrasonic wave that is reflected by the object and returned to the object after being transmitted. The control unit 1200 may perform operations such as calculating a distance to an object and calculating a relative speed of the object based on the ultrasonic wave.

The control unit 1200 may detect and track the object based on the reflected infrared light that is reflected by the object and returned to the object after being transmitted. The control unit 1200 may perform operations such as calculating a distance to an object and calculating a relative speed of the object based on the infrared light.

Depending on the embodiment, the sensor unit 1400 may include a processor separate from the control unit 1200. In addition, the radar 1410, the lidar 1420, the ultrasonic sensor 1440, and the infrared sensor may each individually include a processor.

When the sensor unit 1400 includes a processor, the sensor unit 1400 may be operated under the control of the processor under the control of the control unit 1200.

The vehicle state detection module may sense the state of the vehicle 1000, that is, detect a signal about the state of the vehicle 1000, by using a sensor mounted on the vehicle 1000, and acquire route information of the vehicle according to the sensed signal. The vehicle state detection module may provide the obtained route information to the control unit 1200.

The vehicle state detection module may include, for example, a position sensor (for example, a yaw sensor, a roll sensor, and a pitch sensor), a crash sensor, a wheel sensor, a speed sensor, an inclination sensor, a weight sensor, a heading sensor, a gyro sensor, a position module, a vehicle forward/reverse sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor.

The vehicle state detection module may acquire a sensing signal about vehicle dynamic information, vehicle collision information, vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, a steering wheel rotation angle, vehicle exterior illuminance, pressure applied to the accelerator pedal, and pressure applied to the brake pedal.

The vehicle state detection module may further include, for example, an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crank angle sensor (CAS).

The vehicle state detection module may generate vehicle state information based on the sensing data. The vehicle state information may be information generated based on data sensed by various sensors provided in the vehicle.

Vehicle state information may include, for example, attitude information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, interior temperature information of the vehicle, interior humidity information of the vehicle, pedal position information, or vehicle engine temperature information.

The operation module may control various operations of the vehicle 1000. The operation module may be operated in the autonomous mode.

The operation module may include a driving module, an unparking module, and a parking module.

Depending on the embodiment, the operation module may further include components other than the components described, or may not include some of the components described.

The operation module may include a processor under the control of the control unit 1200. Each module of the operation module may include a processor individually.

Depending on the embodiment when the operation module is implemented as software, it may be a sub-concept of the control unit 1200.

The driving module may perform driving of the vehicle 1000.

The driving module may receive object information from the sensor unit 1400, and provide a control signal to the vehicle driving module to perform the driving of the vehicle 1000.

The driving module may receive a signal from an external device via the communication unit 1100, and provide a control signal to the vehicle driving module to perform the driving of the vehicle 1000.

The unparking module may perform unparking of the vehicle 1000.

The unparking module may receive navigation information from the navigation module, and provide a control signal to the vehicle driving module to perform the departure of the vehicle 1000.

The unparking module can receive object information from the sensor unit 1400 and provide a control signal to the vehicle driving module so as to perform the unparking of the vehicle 1000.

The unparking module may receive a signal from an external device via the communication unit 1100, and provide a control signal to the vehicle driving module to perform the unparking of the vehicle 1000.

The parking module may perform parking of the vehicle 1000.

The parking module may receive navigation information from the navigation module, and provide a control signal to the vehicle driving module to perform the parking of the vehicle 1000.

The parking module may receive object information from the sensor unit 1400, and provide a control signal to the vehicle driving module so as to perform the parking of the vehicle 1000.

The parking module may receive a signal from an external device via the communication unit 1100, and provide a control signal to the vehicle driving module so as to perform the parking of the vehicle 1000.

The navigation module may provide the navigation information to the control unit 1200. The navigation information may include at least one of map information, set destination information, route information according to destination setting, information about various objects on the route, lane information, or current location information of the vehicle.

The navigation module may provide the control unit 1200 with a parking lot map of the parking lot entered by the vehicle 1000. When the vehicle 1000 enters the parking lot, the control unit 1200 receives the parking lot map from the navigation module, and projects the calculated route and fixed identification information on the provided parking lot map so as to generate the map data.

The navigation module may include a memory. The memory may store navigation information. The navigation information may be updated by the information received through the communication unit 1100. The navigation module may be controlled by a built-in processor, or may be operated by receiving an external signal, for example, a control signal from the control unit 1200, but the present disclosure is not limited to this example.

The driving module of the operation module may receive navigation information from the navigation module, and provide a control signal to the vehicle driving module so as to perform the driving of the vehicle 1000.

The storage module is electrically connected to the control unit 1200. The storage module may store basic data for each part of the energy consumption control device, control data for operation control of each part of the energy consumption control device, and input/output data. The storage module may be, in hardware, various storage devices such as a ROM, a RAM, an EPROM, a flash drive, and hard drive. The storage module may store various data for overall operation of the vehicle 1000, such as a program for processing or controlling the control unit 1200, in particular driver propensity information. Here, the storage module may be formed integrally with the control unit 1200 or may be implemented as a sub-component of the control unit 1200.

The power supply unit 1500 may supply power necessary for the operation of each component under the control of the control unit 1200.

Particularly, the power supply unit 1500 may be supplied with power from a battery or the like inside the vehicle 1000.

Figure 9:
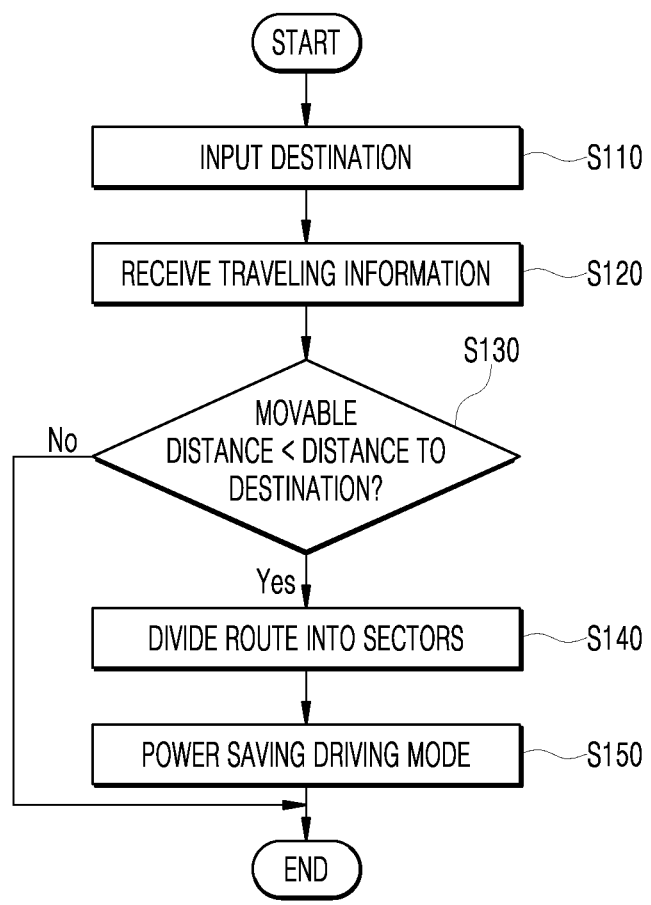
FIG. 9 is a flowchart illustrating a method for controlling energy consumption according to an embodiment of the present disclosure.

FIG. 9 is a flowchart illustrating a method for controlling energy consumption of a vehicle side according to an embodiment of the present disclosure.

Figure 10A:
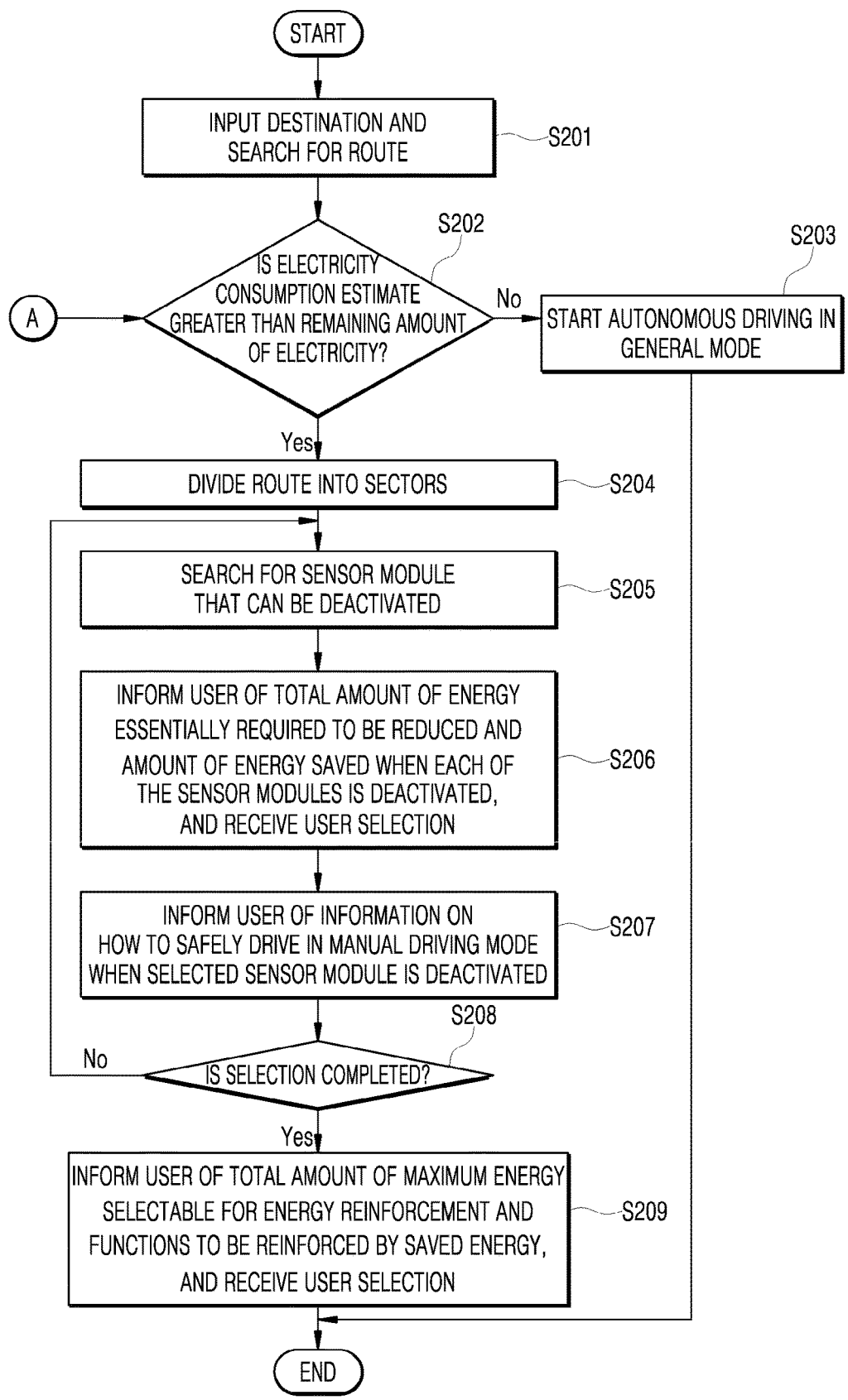
FIGS. 10A and 10B are flowcharts illustrating a method for controlling energy consumption according to an embodiment of the present disclosure.
Figure 10B:
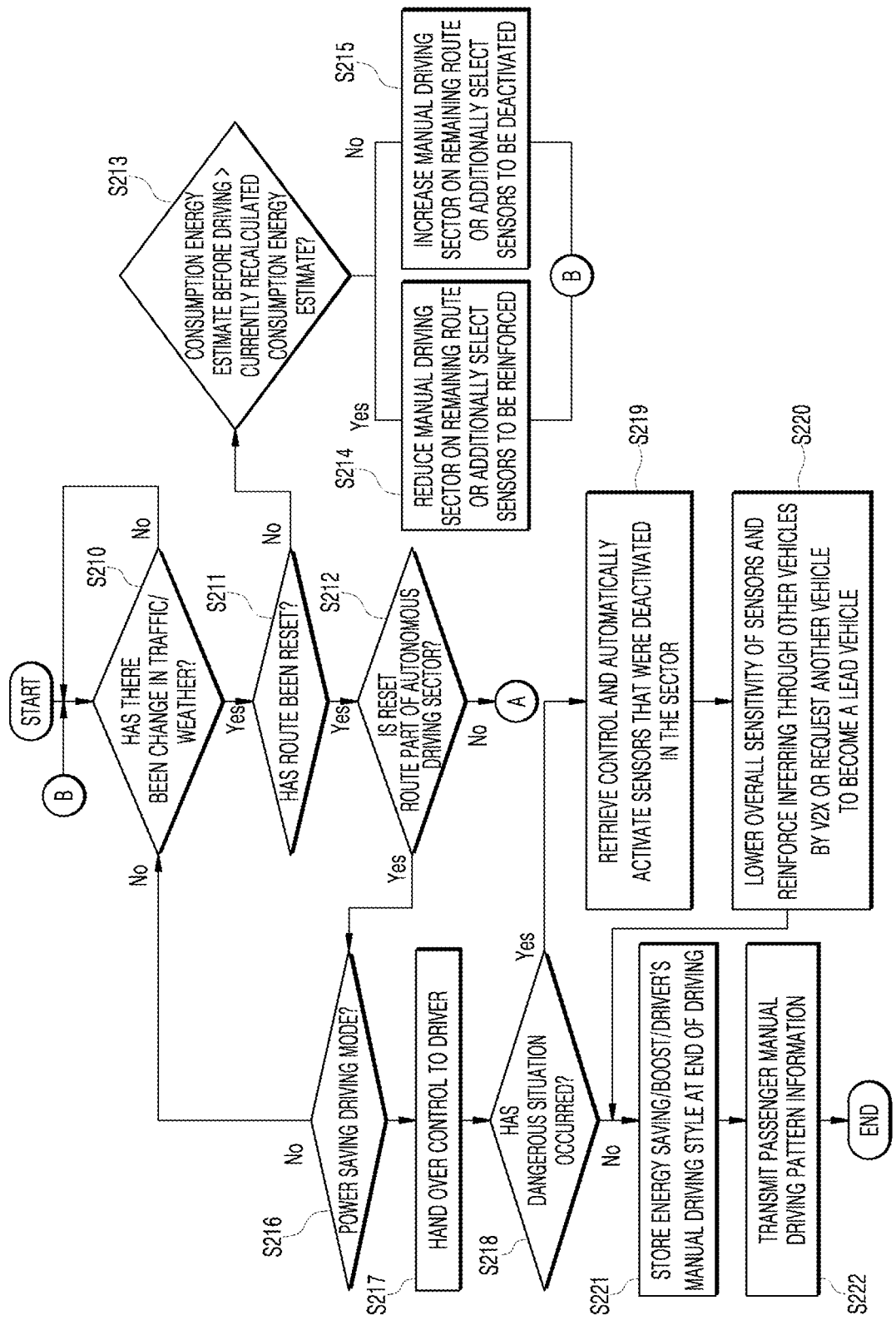

FIGS. 10A and 10B are flowcharts illustrating a method for controlling energy consumption according to an embodiment of the present disclosure.

The method of controlling energy consumption may include steps in addition to the elements which are illustrated in FIGS. 9 to 10B and are described below, or may not include some of the steps which are illustrated in FIGS. 9 to 10B and are described below.

The control unit 1200 may receive a destination to which the vehicle 1000 is to be reached through the user interface unit 1300 (S110, S201).

The control unit 1200 may receive the traveling information from the server 3000 through the communication unit 1100 (S120, S201). The control unit 1200 may receive information about a route to the destination entered by the user at the time of entering the vehicle, for example, road and traffic information provided by the information providing server, weather information provided by the server of the weather center, and information on the energy saving, boosting, and driving pattern provided by the recording server.

The control unit 1200 may calculate the amount of energy that can be supplied from the energy supply source of the vehicle 1000, for example, the remaining battery power amount, estimate the movable distance of the vehicle 1000 based on the calculated amount of energy, and determine whether to activate the power saving driving mode by comparing the estimated movable distance with the distance to the destination (S130, S202). When the estimated movable distance is greater than or equal to the distance to the destination, and it is determined that travel to the destination, particularly autonomous travel to the destination, is possible, the control unit 1200 may not activate the power saving driving mode, and by starting a general mode, particularly the autonomous mode, may end the process (S203).

When the estimated travelable distance is shorter than the distance to the destination, and it is determined that travel to the destination, in particular, autonomous driving, is impossible, the control unit 1200 may search for a route to the location corresponding to the destination, and divide the found route into a plurality of sectors according to the received driving information (S140, S204).

The control unit 1200 may receive traveling information for the route searched from the communication unit 1100, detect vehicle densities according to the position of the route according to the provided traveling information, evaluate the similarity of the detected vehicle densities, and set sectors having similar vehicle densities as one sector.

The control unit 1200 may receive traveling information for the route searched from the communication unit 1100, detect the number of intersections per unit distance of the route according to the provided traveling information, evaluate the similarity of the number of the intersections per unit distance, and set sectors having similar numbers of intersections per unit distance as one sector.

The control unit 1200 may receive weather information for the route searched from the communication unit 1100, detect precipitation amounts of the route in accordance with the received weather information, evaluate the similarity of the detected precipitation amounts, and set sectors having similar precipitation amounts as one sector.

The control unit 1200 may collect traveling information and weather information from the server 3000 through the communication unit 1100, and divide the route into sectors according to geographical and weather characteristics based on the collected information.

For example, the control unit 1200 may divide the route into urban sectors and suburban sectors. That is, the control unit 1200 may measure the number of moving objects to be sensed per unit distance, the number of traffic lights per unit distance, the number of acceleration/deceleration sectors per unit distance, and the vehicle density per unit area, to thereby be used as criteria for division. If there are ten or more intersections with traffic lights within a unit distance of 5 km, the control unit 1200 may set the route as a separate sector.

The control unit 1200 may divide the route into sectors according to the road type. That is, the control unit 1200 may check the number of roundabouts per unit distance, the number of curves per unit distance, the number of steep slopes per unit distance, the ratio of unpaved roads per unit distance, the average width of road per unit distance, and the number of junction sections per unit distance, and use these as criteria for division. If there are three or more roundabouts within a unit distance of 1 km, the control unit 1200 can set the route as a separate sector.

The control unit 1200 may divide the sector of the route according to the weather. That is, the control unit 1200 may check the change in the position of the sun, whether it is day or night, the precipitation, and the temperature according to the traveling direction, and use the checked information as criteria for division of the route. In the case of a route of traveling toward the west at sunset, it may be difficult to secure a view due to glare, and therefore the control unit 1200 may set the route as a separate sector.

The control unit 1200 may activate the power saving driving mode in which the sensor unit 1400 is deactivated in at least one of the plurality of sectors (S150).

The control unit 1200 searches for a sensor module that can be deactivated among the plurality of sensor modules in the sensor unit 1400 in the power saving driving mode (S205), and provides the user with an input means through which the user can select deactivation of the sensor module determined for each sector segmented as described above through the user interface unit 1300.

The control unit 1200 may provide the input means for selecting deactivation through the user interface unit 1300 for the convenience of user input, and may provide information on the total amount of energy essentially required to be reduced, sensor modules which can be deactivated per sector, and the amount of energy saved when each of the sensor modules is deactivated (S206).

The control unit 1200 may output information on a function that is restricted when the sensor unit 1400 is deactivated during the power saving driving mode through the output module of the user interface unit 1300. The control unit 1200 may inform the driver of information on how to safely drive when the sensor unit 1400 is deactivated in a manual traveling sector selected by the user through the user interface unit 1300 (S207).

The control unit 1200 may determine whether the selection of the sensor module to be deactivated is completed according to the signal inputted through the input module of the user interface unit 1300 (S208). When it is determined that the selection of the sensor module to be deactivated is not completed, the control unit 1200 may repeat the step of searching for a sensor module that can be deactivated among the plurality of sensor modules (S205).

When it is determined that the selection of the sensor module to be deactivated is completed, the control unit 1200 may recalculate the movable distance estimate by using the amount of energy which can be supplied from the energy supply source of the vehicle 1000 by reflecting the state of at least one sensor module of the sensor unit 1400 which has been deactivated according to the input of the input module of the user interface unit 1300, and when the recalculated movable distance estimate exceeds the distance to the destination, the control unit 1200 may calculate the extra amount of energy based on the difference between the movable distance estimate and the distance to the destination, and display the functions that can be used by using the calculated extra amount of energy through the output module of the user interface unit 1300 (S209). The control unit 1200 may provide an input means for a function that has been reinforced through the user interface unit 1300 for the convenience of user input. In addition, the control unit 1200 may provide the user with information on the total extra amount of energy that can be used for reinforcing functions, functions that can be reinforced for individual sectors, and the amount of energy which may be used according to the reinforcement of each of the functions.

The control unit 1200 may repeatedly determine whether there has been a change in the traffic situation or the weather during traveling (S210), and when there has been a change in the traffic situation or the weather, the control unit 1200 may determine whether the route has been reset (S211).

When the route has not been reset despite a change in traffic or weather, the control unit 120 may calculate the amount of energy, for example, the remaining battery power amount, which can be supplied from the energy supply source of the vehicle 1000 for the remaining route, and may estimate the movable distance of the vehicle 1000 based on the calculated amount of energy and compare the movable distance estimate with the remaining distance to the destination (S213).

When the movable distance estimate is greater than or equal to the remaining distance to the destination, and it is determined that travel to the destination, particularly autonomous travel to the destination, is possible, the control unit 1200 may proceed to the step (S210) of determining whether there has been a change in the traffic situation or the weather during traveling without additionally deactivating the sensor module or increasing the manual travel sectors (S214). At this time, when the movable distance estimate is greater than the remaining distance to the destination, the control unit 1200 may control the user interface unit 1300 to reduce the manual driving sectors, or additionally select at least one function to be reinforced.

For example, if the weather changes from rain to clear and traffic congestion is alleviated, the movable distance estimate becomes longer than the remaining distance to the destination, and the control unit 1200 may control the user interface unit 1300 to additionally select at least one function to be reinforced with the extra amount of energy.

When the movable distance estimate is shorter than the remaining distance to the destination, and it is determined that travel to the destination, in particular, autonomous driving, is impossible, the control unit 1200 may proceed to the step (S210) of determining whether there has been a change in the traffic situation or the weather during traveling after additionally deactivating the sensor module or increasing the manual traveling sectors (S215). At this time, the control unit 1200 may control the user interface unit 1300 to increase the manual traveling sectors, or additionally select a sensor module to be deactivated.

For example, when traffic jams in an urban area to be driven through in the autonomous mode increase, and the number of sectors of heavy traffic per 3 km increases from ten to twenty, the control unit 1200 may change the sectors into manual driving mode sectors in order to further save energy, and control the user interface unit 1300 to select the sensor module to be deactivated for the remaining sectors.

When the route is reset due to traffic conditions or weather changes, the control unit 1200 determines whether the reset route is a part of an autonomous mode sector (S212).

When the reset route is entirely an autonomous mode sector or a manual driving mode sector, the control unit 1200 may calculate the amount of energy which can be supplied from the energy supply source of the vehicle, estimate the movable distance of the vehicle based on the calculated amount of energy, and compare the movable distance of the vehicle with the distance to the destination to thereby determine whether to activate the power saving driving mode (S202).

When the reset route is partially an autonomous mode sector, the control unit 1200 may maintain the initial setting for the remaining route. At this time, it is determined whether the initial setting is the power saving driving mode (S216), and when the initial setting is not the power saving driving mode, the control unit 1200 may proceed to the step of determining whether there has been a change in the traffic situation or the weather during driving (S210).

When the vehicle 1000 is traveling in the power saving driving mode, the control unit 1200 hands over control to the user, and monitors whether the vehicle 1000 is in a dangerous state (S218). When it is determined that the vehicle is in an emergency, the control unit 1200 may inform the user of the possibility of the danger through the user interface unit 1300, and control the vehicle 1000 in the semi-autonomous driving mode.

When it is determined that the vehicle 1000 is in a dangerous state, the control unit 1200 may retrieve control from the user and reactivate sensor modules of the sensor unit 1400 necessary for preventing danger, for example, the minimum number of sensor modules necessary for autonomous driving, such as modules for adjusting the distance to the front vehicle and maintaining the lane (S219). The control unit 1200 may lower the overall sensitivity of the sensor module of the sensor unit 1400 in order to compensate for the energy consumption increased by the activated sensor module of the sensor unit 1400.

The control unit 1200 may infer a dangerous state by using the activated remaining sensor modules of the sensor unit 1400, query another vehicle 1000' about the sensing information through the V2X communication module, receive a notification signal including information on the query, and infer the dangerous state, or may request the other vehicle 1000' to become a leading vehicle (S220).

For example, when the camera 1430 is deactivated, the control unit 1200 may define the distance and shape of an object which is recognized through the lidar 1420 and the radar 1410, and ask the other vehicle 1000' whether the recognized object is a dangerous element.

When the vehicle 1000 reaches the destination, the control unit 1200 may store power saving, boosting, and the driver's manual driving style in the server 3000, particularly a recording server (S221), and the sever 3000 may acquire the manual driving pattern of the passenger and transmit the acquired pattern information to the vehicle 1000 (S222).

Figure 11:
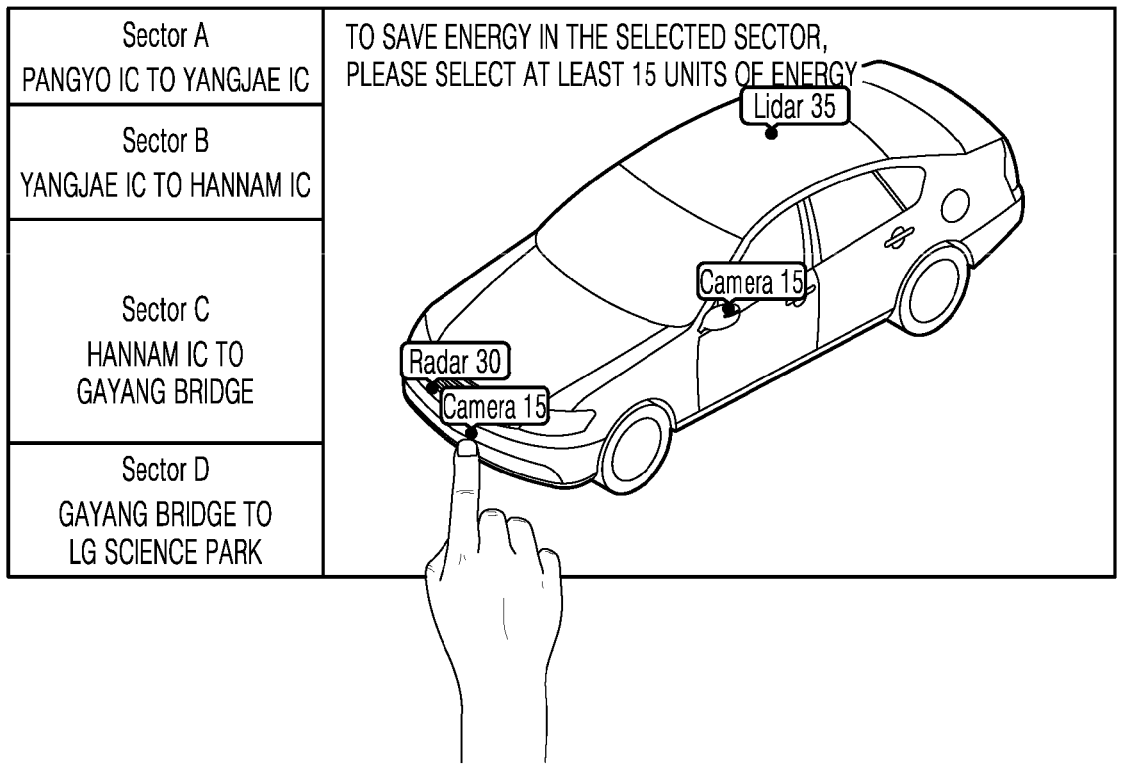
FIGS. 11 and 12 are block diagrams showing an interface of an apparatus for controlling energy consumption which is installed on a vehicle side according to an embodiment of the present disclosure.
Figure 12:
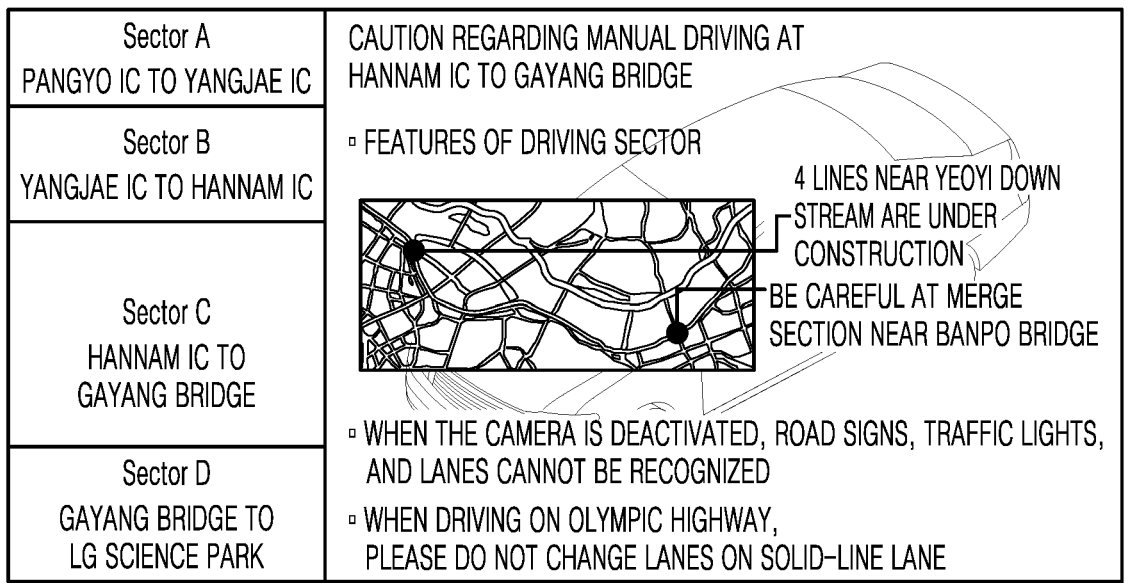

FIGS. 11 and 12 are block diagrams showing an interface of an apparatus for controlling energy consumption which is installed on a vehicle side according to an embodiment of the present disclosure.

As illustrated in FIG. 11, the control unit 1200 may determine the sensor module which may be deactivated among a plurality of sensor modules of the sensor unit 1400 in the power saving driving mode, and may provide the user of the vehicle 1000 with an input means for allowing the user to select deactivation of at least one sensor module which has been determined by sectors (sectors A to D) that have been set through the user interface unit 1300. The control unit 1200 may provide an input means for selection of deactivation through the user interface unit 1300 for the convenience of the user's input, and may provide information on the total amount of energy that should be reduced (for example, "To save energy in the selected sector, please select at least 15 units of energy"), and at least one sensor module which can be deactivated per sector, and the amount of energy which is saved when the sensor module is deactivated (for example, radar 30, camera 15, lidar 35). The user may deactivate the front camera to satisfy the minimum energy saving condition through the user interface unit 1300, as shown in FIG. 11.

As shown in FIG. 12, the control unit 1200 may output information about functions which are restricted when the sensor unit is deactivated in the power saving driving mode, through the user interface unit 1300. Namely, the control unit 1200 may provide the user with necessary information for safe driving according to deactivation of the sensor unit 1400 (for example, "When the camera is deactivated, road signs, traffic lights, and lanes cannot be recognized") through the user interface unit 1300.

The present disclosure described above may be implemented as a computer-readable code in a medium on which a program is recorded. The computer readable medium includes all types of recording devices in which data readable by a computer system readable can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. An apparatus for controlling energy consumption of a vehicle including an energy supply source, the apparatus comprising:
    an input unit configured to receive an input of a destination;
    a sensor unit configured to sense environment information of an area around the vehicle;
    a communication unit configured to receive traveling information from an information providing server; and
    a control unit configured to calculate an amount of energy available from the energy supply source, estimate a movable distance of the vehicle based on the calculated amount of energy, and compare the estimated movable distance with a distance to the destination to thereby determine whether to activate a power saving driving mode,
    wherein the control unit searches for a route to a position corresponding to the destination and divides the route into a plurality of sectors,
    wherein the power saving driving mode is a mode in which the sensor unit is deactivated in at least one of the plurality of sectors, and
    wherein the control unit receives traveling information for the route searched from the communication unit, detects numbers of intersections per unit distance on the route according to the received traveling information, evaluates a similarity of the numbers of the intersections per unit distance, and sets sectors having similar numbers of intersections per unit distance as one sector.

2. The apparatus of claim 1,
    wherein the control unit receives traveling information for the route searched from the communication unit, detects one or more vehicle densities according to one or more positions on the route according to the received traveling information, evaluates a similarity of the detected vehicle densities, and sets sectors having similar vehicle densities as one sector.

3. The apparatus of claim 2, wherein the communication unit receives a remote control signal based on a downlink grant of a fifth generation (5G) network connected for operation of autonomous driving, and
    wherein the control unit controls the vehicle to be driven according to the remote control signal when the estimated movable distance exceeds the distance to the destination.

4. The apparatus of claim 1, wherein the communication unit is configured to receive weather information from a weather center, and
    wherein the control unit receives weather information for the route searched from the communication unit, detects precipitation amounts of the route in accordance with the received weather information, evaluates a similarity about the detected precipitation amounts, and sets sectors having similar precipitation amounts as one sector.

5. The apparatus of claim 1, further comprising an output unit configured to output a sound or an image,
    wherein the control unit controls the output unit to output information about at least one function which is restricted when the sensor unit is deactivated in the power saving driving mode.

6. The apparatus of claim 1, wherein the sensor unit comprises a plurality of sensor modules, and
    wherein the control unit selects at least one sensor module to be deactivated among the plurality of sensor modules in the power saving driving module based on the calculated amount of energy.

7. The apparatus of claim 6, further comprising an output unit configured to output a sound or an image,
    wherein the control unit controls the output unit to output information about at least one function which is restricted when one of the sensor modules is deactivated in the power saving driving mode.

8. The apparatus of claim 1, further comprising an output unit configured to output a sound or an image,
    wherein the sensor unit comprises a plurality of sensor modules, wherein the input unit designates at least one sensor module among the plurality of sensor modules according to a user's input and inputs a deactivation signal to the control unit, and wherein the control unit controls the output unit to display at least one sensor module to be deactivated among the plurality of sensor modules in the power saving driving module based on the calculated amount of energy, and deactivates at least one of the sensor modules designated according to a signal inputted through the input unit.

9. An apparatus for controlling energy consumption of a vehicle including an energy supply source, the apparatus comprising:

an input unit configured to receive an input of a destination;

a sensor unit configured to sense environment information of an area around the vehicle;

a control unit configured to calculate an amount of energy available from the energy supply source, estimate a movable distance of the vehicle based on the calculated amount of energy, and compare the estimated movable distance with a distance to the destination to thereby determine whether to activate a power saving driving mode; and an output unit configured to output a sound or an image, wherein the control unit searches for a route to a position corresponding to the destination and divides the route into a plurality of sectors, wherein the power saving driving mode is a mode in which the sensor unit is deactivated in at least one of the plurality of sectors, wherein the sensor unit comprises a plurality of sensor modules, wherein the input unit designates at least one sensor module among the plurality of sensor modules according to a user's input and inputs a deactivation signal to the control unit, wherein the control unit controls the output unit to display at least one sensor module to be deactivated among the plurality of sensor modules in the power saving driving module based on the calculated amount of energy, and deactivates at least one of the sensor modules designated according to a signal inputted through the input unit, and wherein the control unit recalculates a movable distance estimate in consideration of a state of the at least one deactivated sensor module according to the input of the input unit, and when the recalculated movable distance estimate exceeds a distance to the destination, the control unit calculates an extra amount of energy based on a difference between the movable distance estimate and the distance to the destination, and controls the output unit to display one or more functions usable by the calculated extra amount of energy.

10. A method for controlling energy consumption of a vehicle including an energy supply source, the method comprising:

a first step of receiving an input of a destination;

a second step of receiving traveling information;

a third step of calculating an amount of energy available from the energy supply source, estimating a movable distance of the vehicle based on the calculated amount of energy, and comparing the estimated movable distance with a distance to the destination to thereby determine whether to activate a power saving driving mode; and a fourth step of searching for a route to a position corresponding to the destination and dividing the route into a plurality of sectors, wherein the power saving driving mode is a mode in which a sensor unit is deactivated in at least one of the plurality of sectors, and wherein the fourth step includes searching for a route to a position corresponding to the destination, detecting numbers of intersections per unit distance on the route according to the received traveling information, evaluating a similarity of the numbers of the intersections per unit distance, and setting sectors having similar numbers of intersections per unit distance as one sector.

11. The method of claim 10, wherein the fourth step includes searching for a route to a position corresponding to the destination, detecting one or more vehicle densities according to one or more positions on the route according to the received traveling information, evaluating a similarity of the detected vehicle densities, and setting sectors having similar vehicle densities as one sector.

12. The method of claim 10, further comprising receiving weather information, and wherein the fourth step further includes searching for a route to a position corresponding to the destination, detecting precipitation amounts on the route in accordance with the received weather information, evaluating a similarity of the detected precipitation amounts, and setting sectors having similar precipitation amounts as one sector.

13. The method of claim 10, further comprising outputting information about at least one function which is restricted when the sensor unit is deactivated in the power saving driving mode.

14. The method of claim 10, further comprising selecting at least one sensor module to be deactivated among a plurality of sensor modules of the vehicle in the power saving driving module based on the calculated amount of energy.

15. The method of claim 14, further comprising outputting information about at least one function which is restricted when the sensor module to be deactivated is deactivated in the power saving driving mode.

16. The method of claim 10, further comprising:

a fifth step of selecting at least one sensor module to be deactivated among a plurality of sensor modules in the power saving driving module based on the calculated amount of energy, and displaying the selected sensor module;

a sixth step of designating at least one sensor module among the plurality of sensor modules, and receiving an input of a signal to deactivate the designated sensor module; and a seventh step of deactivating the at least one sensor module designated according to the signal inputted at the sixth step.

17. The method of claim 16, further comprising:

an eighth step of recalculating a movable distance estimate in consideration of a state of the at least one sensor module deactivated at the seventh step;

a ninth step of, when the recalculated movable distance estimate exceeds a distance to the destination, calculating an extra amount of energy based on a difference between the movable distance estimate and the distance to the destination; and a tenth step of displaying one or more functions usable by the calculated extra amount of energy.

18. A non-transitory computer-readable recording medium having recorded thereon a program configured to perform the method of claim 10.

\* \* \* \* \*